(12) United States Patent
Sharma et al.

(10) Patent No.: US 8,776,011 B2
(45) Date of Patent: Jul. 8, 2014

(54) METHOD AND APPARATUS FOR MANAGING COMPONENTS OF APPLICATION ENABLEMENT SUITE

(75) Inventors: Alok Sharma, Lisle, IL (US); Yigang Cai, Naperville, IL (US)

(73) Assignee: Alcatel Lucent, Paris (FR)

( * ) Notice: Subject to any disclaimer, the term of this patent is extended or adjusted under 35 U.S.C. 154(b) by 577 days.

(21) Appl. No.: 13/077,718

(22) Filed: Mar. 31, 2011

(65) Prior Publication Data
US 2012/0254825 A1 Oct. 4, 2012

(51) Int. Cl.
*G06F 9/44* (2006.01)

(52) U.S. Cl.
USPC ........... 717/106; 717/101; 717/102; 717/103; 717/107; 717/120; 717/121; 717/109

(58) Field of Classification Search
None
See application file for complete search history.

(56) References Cited

U.S. PATENT DOCUMENTS

| | | | |
|---|---|---|---|
| 2008/0235656 A1* | 9/2008 | Hui et al. | 717/104 |
| 2010/0125623 A1* | 5/2010 | Rice et al. | 709/202 |
| 2010/0125826 A1* | 5/2010 | Rice et al. | 717/107 |
| 2010/0186089 A1* | 7/2010 | Fu et al. | 726/23 |
| 2011/0078203 A1* | 3/2011 | Cohen et al. | 707/793 |
| 2011/0154226 A1* | 6/2011 | Guertler et al. | 715/760 |
| 2011/0295853 A1* | 12/2011 | Li et al. | 707/736 |
| 2011/0296518 A1* | 12/2011 | Faynberg et al. | 726/13 |
| 2011/0320525 A1* | 12/2011 | Agarwal et al. | 709/203 |
| 2012/0030592 A1* | 2/2012 | Cui et al. | 715/763 |
| 2013/0212179 A1* | 8/2013 | Scotto Di Carlo et al. | 709/204 |

OTHER PUBLICATIONS

Guinard et al., "Sharing Using Social Networks in a Composable Web of Things," 2010.*
Cappiello et al., "A Quality Model for Mashup Components," Springer-Verlag Berlin Heidelberg 2009.*
Shevertalov et al., "A Case Study on the Automatic Composition of Network Application Mashups," 2008.*
"Alcatel-Lucent opens developer sandbox in the sky," Feb. 16, 2010.*
"Alcatel-Lucent Offers Application Exposure Suite," Dec. 2, 2009.*
"Alcatel-Lucent fosters the creation of new business models between service providers, developers and content providers to accelerate application innovation," Dec. 3, 2009.*
Lawson, "Alcatel Offers to Streamline Mobile App Creation," Dec. 3, 2009.*
Daniel et al., "Turning Web Applications into Mashup Components: Issues, Models, and Solutions," Springer-Verlag Berlin Heidelberg 2009.*

(Continued)

*Primary Examiner* — Insun Kang
(74) *Attorney, Agent, or Firm* — Fay Sharpe LLP

(57) ABSTRACT

A method of managing components of an AES includes: a) providing an application developer with access to a workflow designer engine via a developer portal, wherein the workflow designer engine and developer portal are in operative communication with an AES; b) activating a network application manager of the workflow designer engine in response to the application developer selecting a manage network application function via the user device in conjunction with a graphical user interface (GUI) controlled by the developer portal; and c) creating a new network application using archetypes of the workflow designer engine and repositories of the developer portal in response to the application developer defining at least some parameters for the new network application in conjunction with the GUI. An associated apparatus includes a workflow designer engine server with a workflow designer engine module; and a developer portal server with a developer portal module.

21 Claims, 28 Drawing Sheets

(56) References Cited

OTHER PUBLICATIONS

Guinard, "Mashing up Your Web-Enabled Home," 2010.*

"The Mobile App Gold Rush Speeds Up," Anchor Report, Yankee Group Research, Inc., shop.yankeegroup.com/product_img4.php?id=334&img=1, 2010, printed on Mar. 31, 2011, 1 page.

Alcatel-Lucent, "Open API Platform," www.alcatel-lucent.com/wps/portal/!ut/p/kcxml/04_Sj9SPykssy0xPLMnMz0vM0Y . . . , 2006, printed on Mar. 31, 2011, 1 page.

Alcatel-Lucent, "API Exposure Suite," www2.alcatel-lucent.com/application_enablement/application_exposure_suite_php, 2006, printed on Mar. 31, 2011, 2 pages.

Alcatel-Lucent, "Seizing the Digital Opportunity The New Application Paradigm," 2009, 7 pages.

Alcatel-Lucent, "Profiting from Data Growth in Wireline Networks Application Enablement use cases and business models," 2010, 11 pages.

Alcatel-Lucent, "Open API Service," 2010, 4 pages.

Alcatel-Lucent, "Open API Service, Network Technology Meets Smart Monetization: Build, manage and distribute profitable applications for consumers everywhere," 2010, 8 pages.

* cited by examiner

FIG. 22

Feature Management – Create/Edit Policy

Logged In Template Header 3

CREATE POLICY    EDIT POLICY <FEATURE ID>    LOGGED IN
Description. Fields marked with * are mandatory.    PROFILE WIDGET Policy Name*
PolicyA Policy Description
Policy Example A Policy Version*
1.0

Bundle(s) implementing this Policy*
[          ]  [ Browse ]  [ Import ]
Policy Bundle A    [ Remove ]

Helper features for this Policy*
[          ]  [ Browse ]  [ Import ]
Utility$_1$    All Versions    [ Remove ]
Utility$_2$    1.0 - 1.X    [ Remove ]

This policy is compatible with the following Feature Types*
☐ Enabler    ☐ Service
☐ This policy is can be configured for partners, applications, and campaigns

[ View References ]    Popup to show the features where this policy is listed as a dependency

[ CANCEL ]  [ Submit ]

Logged in Template Footer 3

FIG. 23

Feature Management - Create/Edit Service

Logged In Template Header 3

CREATE SERVICE   [EDIT POLICY <FEATURE ID>]
Description. Fields marked with * are mandatory.

Service Name*
[Composite Service₁]

Service Description
[Composite Service Example 1]

Service Version*
[1.0]

Bundle(s) implementing this Service*
[          ] [Browse] [Add]
Svc Logic Bundle  [Remove]

Helper features for this Service*
[          ] [Browse] [Import]
Policy₁    All Versions   [Remove]
Enabler₂   1.0 - 1.X      [Remove]

This service is compatible with the following*

Partner Types
☐ Content
☐ Application
☐ Privacy Access

Application Types
☐ Default
☐ Campaign-based

Default Policy Configuration    Management and Accounting*    Provisioning Synchronization
[Parameters]                    [Parameters]                   [Parameters]

Build dynamic UI to specify rule-context values for each policy referred to in the policy bundle Web Services Gateway Exposure*
☐ SOAP    [Parameters]
☐ REST    [Parameters]
☐ NATIVE  [Parameters]

Go to API Parameters SOAP, API Parameters REST, API Parameters NATIVE

[CANCEL] [Submit]

Logged in Template Footer 3

FIG. 24

Feature Management - Create/Edit Enabler

```
Logged In Template Header
3
```

CREATE Enabler          ⌐EDIT POLICY <FEATURE ID>⌐ ⌐ ⌐ ⌐ ⌐ ⌐ ⌐ ⌐ ⌐ ⌐ ¬
Description. Fields marked with * are mandatory.

Enabler Name*
[Composite Enabler₁]

Enabler Description
[Composite Enabler Example 1]

Enabler Version*
[1.0]

Bundle(s) implementing this Enabler*          [View References]
[        ] [Browse] [Add]                     ┌─────────────────────────────┐
Svc Logic Bundle  [Remove]                    │ Popup to show the features  │
                                              │ where this enabler is listed│
Helper features for this Enabler*             │ as a dependency             │
[        ] [Browse] [Import]                  └─────────────────────────────┘
Utility₁   All Versions    [Remove]
Policy₂    1.0 - 1.X       [Remove]

Default Policy Configuration    Management and Accounting*    Provisioning Synchronization
[Parameters]                    [Parameters]                  [Parameters]

This Enabler is compatible with the following*    ┌──────────────────────────────────────────┐
Partner Types                                     │ Build dynamic UI to specify enabler-context│
  ☐ Content          Application Types            │ values for each enabler referred to in the │
                       ☐ Default                  │ enabler bundle                             │
  ☐ Application       ☐ Campaign-based            │ For ISG, this is used to provide the global│
  ☐ Privacy Access                                │ parameters like sorry message and CDR config│
                                                  └──────────────────────────────────────────┘
Web Enablers Gateway Exposure      Enabler Configuration*
  ☐ SOAP    [Parameters]             ☐ SOAP    [API Group A ▼]   [Parameters]
  ☐ REST    [Parameters]             ☐ REST    [API Group A ▼]   [Parameters]
  ☐ NATIVE  [Parameters]             ☐ NATIVE  [API Group A ▼]   [Parameters]

[CANCEL]  [Submit]

Logged in Template Footer 3

FIG. 25

Feature Management - Create/Edit Utility Feature

Logged In Template Header
3

CREATE UTILITY <EDIT UTILITY <FEATURE ID>         LOGGED IN
Description. Fields marked with * are mandatory.    PROFILE WIDGET Utility Feature Name*
UtilityA Utility Feature Description Utility Example A Utility Feature Version*
1.0

Bundle(s) implementing this Utility Feature*
[      ]  [Browse]  [Import]
Utility Bundle A   [Remove]

Helper features for this Utility Bundle*
[      ]  [Browse]  [Import]
Utility₁   All Versions    [Remove]
Utility₂   1.0 - 1.X       [Remove]

[View References]   Popup to show the features where this utility feature is listed as a dependency

[CANCEL]  [Submit]

Logged in Template Footer 3

FIG. 26

API Policy Parameters Wireframe

POLICY PARAMETERS <Feature Name>
Description. Fields marked with * are mandatory.

Apply this treatment when policy evaluation fails:

[All Disallowed ▼]

All disallowed
All allowed

| PolicyA | PolicyB | PolicyC | PolicyD | PolicyE | PolicyF |

Dynamically generated list of tabs based on policies referenced in the bundle

<PolicyA> POLICY PARAMETERS
Description. Fields marked with * are mandatory.
☑ The <PolicyA> Policy is enabled Dynamically generated form to configure the rule context for the policy. Possibly provide a reflection style interface in the bundle to drive the GU generation.

Default Log Frequency (?)  [Always ▼]

[CLEAR] [SUBMIT]

[CANCEL] [SAVE]

FIG. 27

Management/Accounting Parameters Wireframe

Management and Accounting PARAMETERS <Feature Name>
Description. Fields marked with * are mandatory.

EDR Collection

These types of EDRs should be collected for this API:

- ☑ Application-Level
- ☑ Network-Level
- ☑ Composition-Level

Monitoring settings for this API

- ☑ Enable real-time measurement collection
- ☑ Enable SNMP monitoring

Monitoring Callback URL
[                    ]

Policy Audit Interval (seconds)
[30                  ]

Billing settings for this API

- ☑ Billing enabled
- ☑ Enable bulk billing

Billing Type  [Online ▼]  
Offline / Online / Both

[CANCEL] [SAVE]

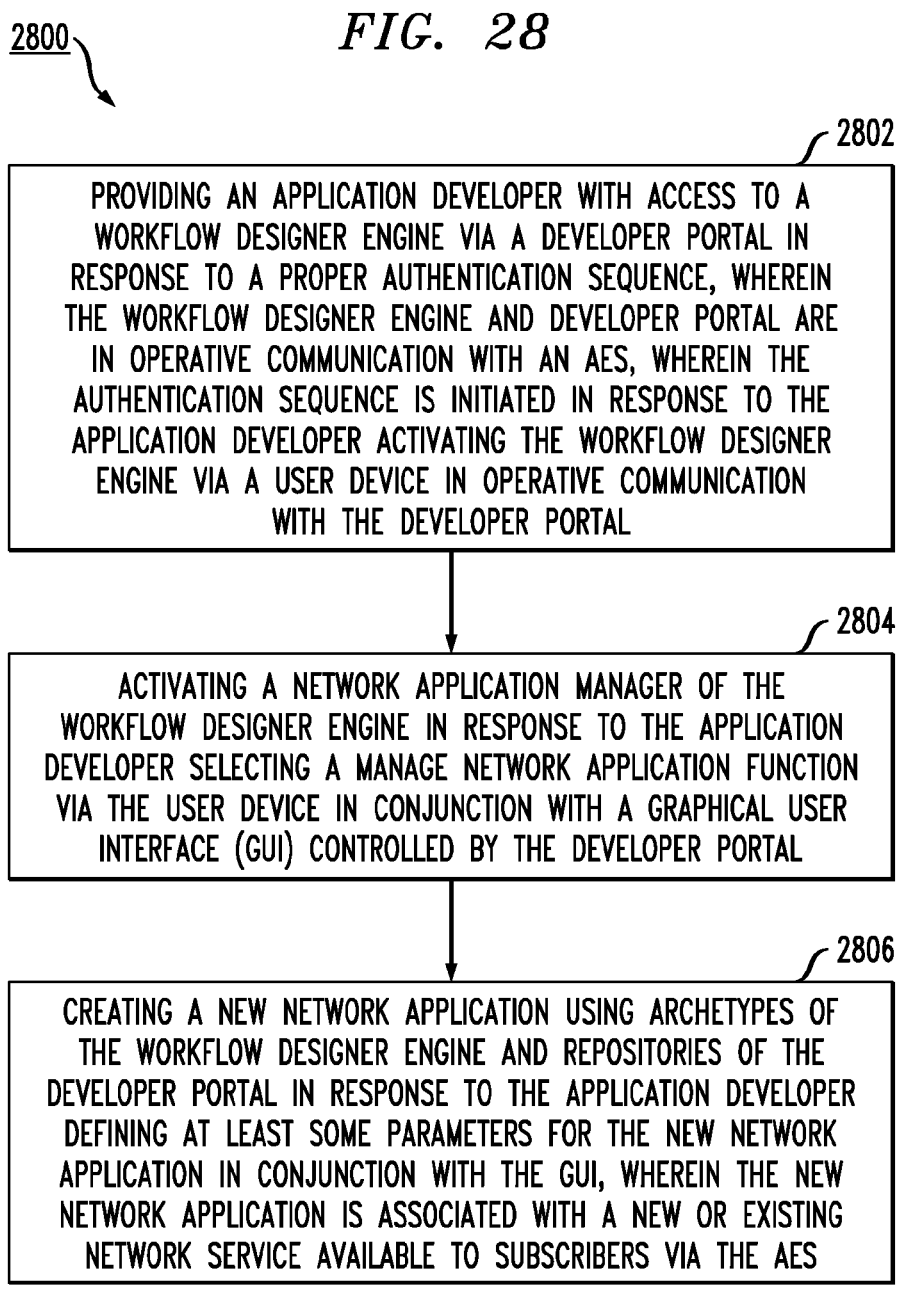

METHOD AND APPARATUS FOR MANAGING COMPONENTS OF APPLICATION ENABLEMENT SUITE

BACKGROUND

This disclosure relates to a technique for managing components of an application enablement suite (AES).

Alcatel-Lucent of Paris, France makes network assets available to partners of network operators, application developers, and content providers through its API Enablement Suite which implements an application enablement vision through a secure exposure layer. The assets can be used to personalize and enrich web-based services making them more appealing and valuable. FIG. 1 provides a functional diagram of Alcatel-Lucent's application enablement offering.

Extensive and recent market analysis shows that the revenues generated from smartphone application downloads will exceed $11 billion in 2014 (see FIG. 2) and that downloads that are paid applications will increase from 33% in 2010 to 48% in 2014 (Source: The Mobile App Gold Rush Speeds Up by Yankee Group—March 2010). FIG. 2 provides a revenue projection application downloads. The ability to evolve application portfolios with market changes and successful experiences among partners, program developers, and network operators will make market offers more compelling and determine the overall success of new network services offered by service providers.

As more and more applications become available from the Internet, application stores, and social networks the challenge for network service providers to integrate subscribers into application partners and social network partners is significantly increased. For example, there is a need for improved products to integrate telecommunication networks with Internet services, application stores, and social networks.

For these and other reasons, there is a need to provide a solution to manage components of an AES that is robust, scalable, and expandable to accommodate AESs that offer diverse services across various types of networks using a variety of technological solutions. For example, there is a specific need to help telecommunication network service providers tap into the growing demand of mobile applications and social networks to provide such services to its subscribers.

SUMMARY

In one aspect, a method of managing components of an AES is provided. In one embodiment, the method includes: a) providing an application developer with access to a workflow designer engine via a developer portal in response to a proper authentication sequence, wherein the workflow designer engine and developer portal are in operative communication with an AES, wherein the authentication sequence is initiated in response to the application developer activating the workflow designer engine via a user device in operative communication with the developer portal; b) activating a network application manager of the workflow designer engine in response to the application developer selecting a manage network application function via the user device in conjunction with a graphical user interface (GUI) controlled by the developer portal; and c) creating a new network application using archetypes of the workflow designer engine and repositories of the developer portal in response to the application developer defining at least some parameters for the new network application in conjunction with the GUI, wherein the new network application is associated with a new or existing network service available to subscribers via the AES.

In another aspect, a method of managing components of an AES is provided. In one embodiment, the method includes: a) providing an application developer with access to a workflow designer engine via a developer portal in response to a proper authentication sequence, wherein the workflow designer engine and developer portal are in operative communication with an AES, wherein the authentication sequence is initiated in response to the application developer activating the workflow designer engine via a user device in operative communication with the developer portal; b) activating a composite network application manager of the workflow designer engine in response to the application developer selecting a manage composite network application function via the user device in conjunction with a GUI controlled by the developer portal; c) creating a new composite network application using archetypes of the workflow designer engine and repositories of the developer portal in response to the application developer defining at least some parameters for the new composite network application in conjunction with the GUI, wherein the new composite network application is associated with a new or existing composite network service available to subscribers via the AES and associated with at least one of multiple network services, multiple service providers, multiple service networks, and multiple communication sessions; d) activating an API manager of the workflow designer engine in response to the application developer selecting a manage API function via the user device in conjunction with the GUI; and e) creating a new API using archetypes of the workflow designer engine and repositories of the developer portal in response to the application developer defining at least some parameters for the new API in conjunction with the GUI, wherein the new API is associated with the new composite network application.

In yet another aspect, an apparatus for managing components of an AES is provided. In one embodiment, the apparatus includes: a workflow designer engine server including a workflow designer engine module; and a developer portal server including a developer portal module in operative communication with the workflow designer engine module. The workflow designer engine module and developer portal module are in operative communication with an AES. The developer portal module provides an application developer with access to the workflow designer engine module in response to a proper authentication sequence, wherein the authentication sequence is initiated in response to the application developer activating the workflow designer engine module via a user device in operative communication with the developer portal module. The workflow designer engine module activates a composite network application manager in response to the application developer selecting a manage composite network application function via the user device in conjunction with a GUI controlled by the developer portal module. A new composite network application is created using archetypes of the workflow designer engine module and repositories in storage devices of the developer portal module in response to the application developer defining at least some parameters for the new composite network application in conjunction with the GUI. The new composite network application is associated with a new or existing composite network service available to subscribers via the AES and associated with at least one of multiple network services, multiple service providers, multiple service networks, and multiple communication sessions. The workflow designer engine module activates an API manager in response to the application developer selecting a manage API function via the user device in conjunction with the GUI. A new API is created using archetypes of the workflow designer engine module and repositories in storage devices of the developer portal module in response to the application developer defining at least some parameters for the new API in conjunction with the GUI, wherein the new API is associated with the new composite network application.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 22 is a drawing of an exemplary screen design for a create/edit policy function associated with feature management in a system for managing components of an AES;

FIG. 23 is a drawing of an exemplary screen design for a create/edit service function associated with feature management in a system for managing components of an AES;

FIG. 24 is a drawing of an exemplary screen design for a create/edit enabler function associated with feature management in a system for managing components of an AES;

FIG. 25 is a drawing of an exemplary screen design for a create/edit utility feature function associated with feature management in a system for managing components of an AES;

FIG. 26 is a drawing of an exemplary screen design for a policy parameters function associated with feature management in a system for managing components of an AES;

FIG. 27 is a drawing of an exemplary screen design for a management/accounting parameters function associated with feature management in a system for managing components of an AES;

FIG. 28 is a flow chart of an exemplary embodiment of a process for managing components of an AES;

DETAILED DESCRIPTION

Figure 1:
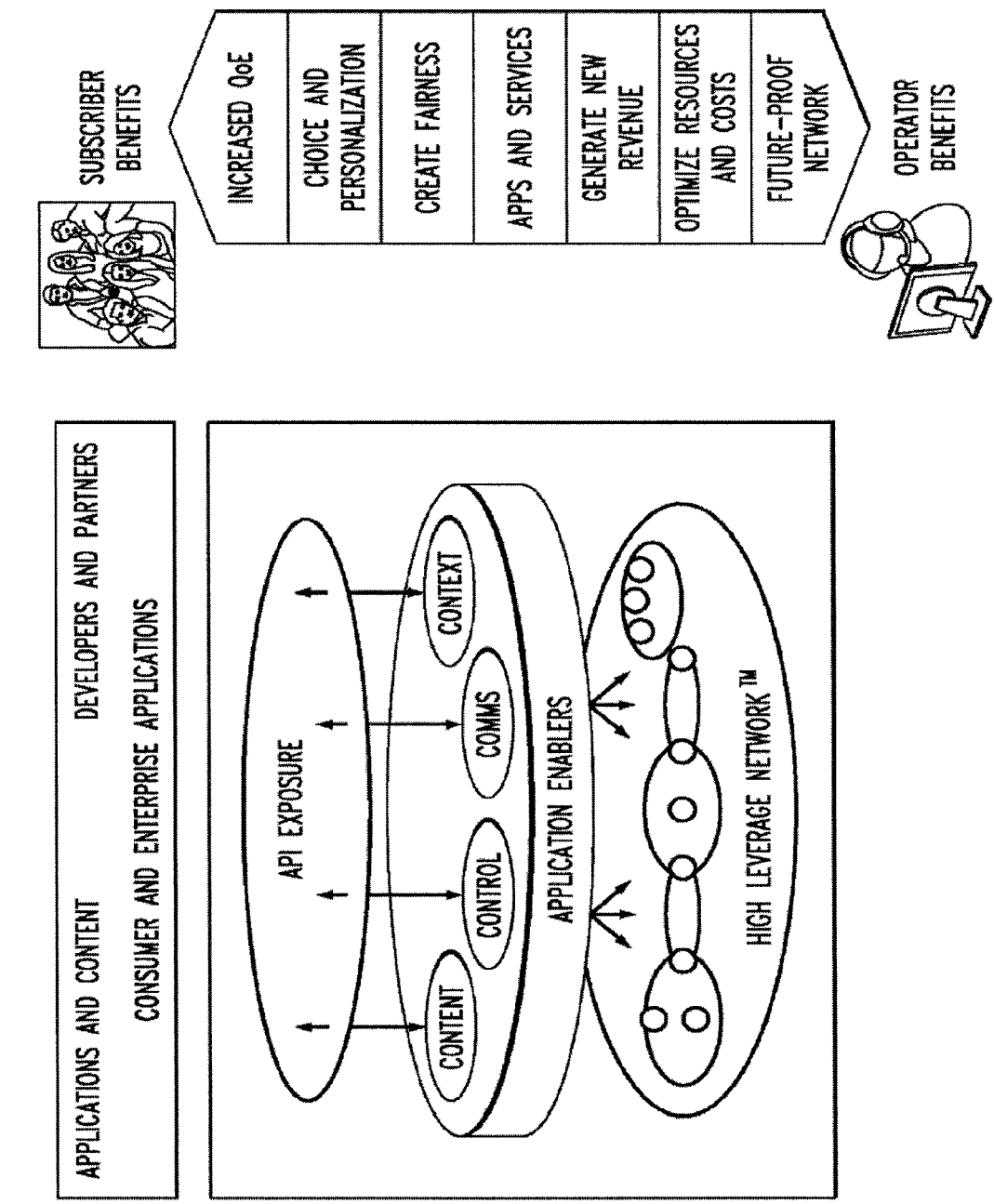
FIG. 1 is a functional diagram of a current application enablement offering from Alcatel-Lucent.
Figure 2:
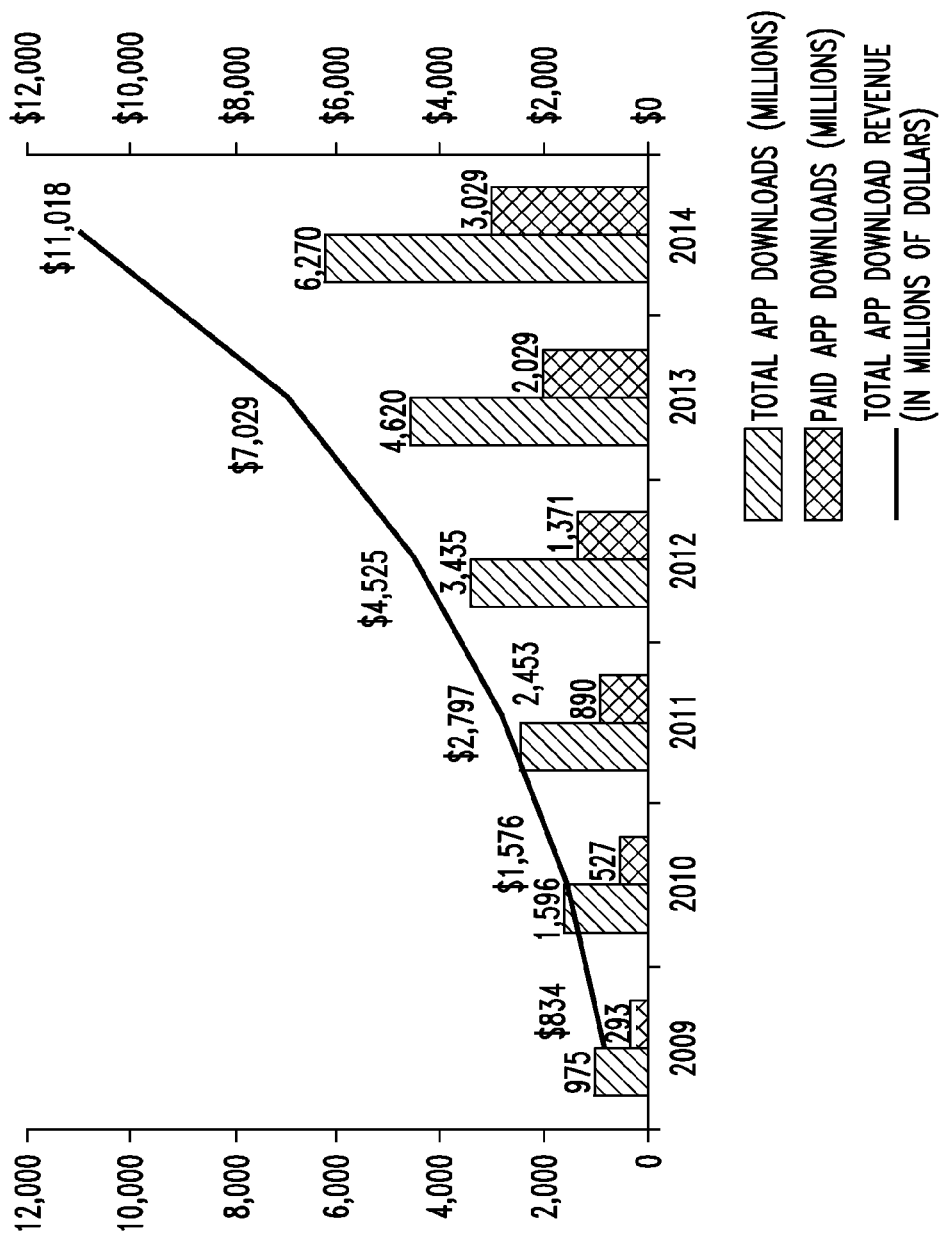
FIG. 2 is a chart showing a revenue projection for smartphone application downloads.

This disclosure relates to a technique for managing components of an AES. The technique includes providing an application developer with access to a workflow designer engine via a developer portal both of are in operative communication with the AES. A network application manager is activated to create a new network application. The new network application is associated with a new or existing network service available to subscribers via the AES. New application program interfaces (APIs), new application services, new application rules/policies, new application enablers, new application mashups, and new application bundles associated with the new network application may also be created. The new network application may be tested and deployed to the AES. The new or existing network service can be a composite network service. If so, the new network application is a composite network application. The techniques also create new simulators for testing, new rule/policy creation tools, and new configuration management tools. An apparatus for managing components of an AES includes a workflow designer engine server with a workflow designer engine module; and a developer portal server with a developer portal module in operative communication with the workflow designer engine module.

Various embodiments of methods and apparatus provide techniques for managing components of an AES. In one embodiment, the method includes a) providing an application developer with access to a workflow designer engine via a developer portal, wherein the workflow designer engine and developer portal are in operative communication with an AES; b) activating a network application manager of the workflow designer engine in response to the application developer selecting a manage network application function via a user device in conjunction with a GUI controlled by the developer portal; and c) creating a new network application using archetypes of the workflow designer engine and repositories of the developer portal in response to the application developer defining at least some parameters for the new network application in conjunction with the GUI. The new network application is associated with a new or existing network service available to subscribers via the AES. In other embodiments, the method can create new APIs, new application services, new application rules/policies, new application enablers, new application mashups, and new application bundles. In additional embodiments a test manager can be used to test the new network application and a deployment manager can be used to deploy the new network application. The new or existing network service can be a composite network service. If so, the new network application is a composite network application. In further embodiments, the method can be used to create new simulators for testing, new rule/policy creation tools, and new configuration management tools. An apparatus for managing components of an AES includes a workflow designer engine server with a workflow designer engine module; and a developer portal server with a developer portal module in operative communication with the workflow designer engine module.

This disclosure provides a layer to an AES that may be referred to an a partner portal layer with a workflow designer engine to help the telecommunication service providers for tap into the growing demand of mobile applications and social networks to provide such services to its subscribers. The partner portal layer facilitates creation of a rich, vibrant and balanced ecosystem. Additionally, the partner portal layer helps service providers manage the partner/developer relationship and impacts on the day-to-day operations of the operator/partner/developer community via the AES. The partner portal layer also allows service providers to organize and run related developer events.

AES Portal's API Management/Governance

This disclosure provides a streamlined workflow designer and process modeling engine to govern, manage and onboard a suite of AES's self-service and automated web portals from all aspects of partner(s)/partner entities, including APIs, rules, widgets, screens, wizards, portlets, etc. and associate them with a combination of content providers, social community developers, mobile virtual network operators (MVNOs), mobile virtual network enablers (MVNEs), etc. In addition to providing the actionable intelligence based on the dynamic situation, the system also enables API access gateway functionality that exposes services to partners, content providers, etc. over the Internet in order to create a service delivery environment for efficient service delivery and allows third-party developers to design and deliver a combination of screen-flow based agile web, information technology (IT), and telecommunication applications.

The API-related part of the partner/API portal allows operators to centrally and automatically manage the APIs that are exposed through the AES. Based upon the changing technical/business needs, this component will automatically govern, control, and dynamically update the lifecycle of the APIs of AES, including APIs provided with the AES solution as well as new enablers and composite APIs created on the service composition framework (SCF) of the AES. This functionality includes: i) auto-programming of the APIs which includes defining northbound, southbound, and platform properties; ii) dynamically uploading and unloading APIs and their versions. Unloading APIs automatically triggers the removal of the client/target service endpoints and also initiates the callback to confirm the deletion of final image for the associated API version; iii) auto-activating and deactivating loaded APIs and their versions based upon instantiation of applications, services, screens, database (DB) instances, utilities, widgets, portlets, etc. and a specific set of network entities; iv) auto-tune into the self-streaming status of the APIs; and v) create new APIs, rules, wizards in a self-regulated manner.

The following management functions are available through their respective portals: i) partner/API portal, ii) automation in system management portal; and iii) high performance portal using hypertext transfer protocol (HTTP) proxylet container and protocol agnostic session context middleware.

Partner/API Portal

The partner portal implements and allows performing functionalities related to the management of the partner(s)/partner entities, APIs and rules/policies. Partner-related portal component(s) allow a network provider or partner, through a partner management UI to onboard and manage applications that use the AES and APIs exposed by the AES. Partner-related portal component(s) also allow a network provider to create and modify partner-related processes associated with the management of partners in the AES.

API-related portal component(s) allow an operator to onboard/expose APIs and to make available necessary auto-testing tools. API-related portal component(s) also allow an operator to create and modify API-related processes associated with the management of APIs in the AES in an on-demand fashion. API governance regulates the APIs being exposed by combining products and associated services. API governance includes tools for self-checking of an API against the loaded API rules and policies. API governance also includes tool support for modeling the data and parameters of the APIs to auto-test that the APIs are mutually consistent. In addition to supporting industry best practices for API design, the API governance's value added services apply API lifecycle management considerations to the development and maintenance of APIs in an on-demand fashion.

The partner/API portal exposes self-provisioning process APIs which are used by the partner portal user interface to manage the partner entities (e.g., partner, application, or campaign), the APIs, and their life cycles.

Data related to the partner entity definitions, partner credentials, and APIs is automatically loaded in separate DB repositories. Access to these repositories is through the partner/API management APIs and partner/API-related processes for using and managing the GUI.

The rule/policy-related part of the partner portal is responsible for providing a central place for the network provider to manage the rules and policies associated with APIs that are exposed through the AES. This component governs and controls the lifecycle of the rules/policies in the AES using exposed provisioning process APIs. This user interface (UI) interfaces with the rule/policy management server to provide the following functionality: i) automatically create/modify/delete rules/policies based upon the virtual schema, virtual/proxy web services, pluggable APIs, programmable interfaces, portlets, utilities, etc., ii) auto-activate and deactivate rules/policies, iii) auto-tune into self-streaming status of the rules/policies, and iv) self-provision the rules/policies in conjunction with partners and partners' applications as well as partners' APIs.

The rule/policy definitions will be maintained in a DB which may be part of rule/policy management server. Access to this repository will be through the rule/policy management APIs and associated provisioning processes. API and partner parts of the partner portal use the API to determine what rule/policy data to collect during on boarding by the partner and/or administrator.

The API management and rule/policy management parts of the partner portal have the same user log-in as the partner management part. Role and permissions are used to determine whether a given administrator has access to the API management part or policy management part.

Automation in System Management Portal

The system management portal provides the central management component to create an automated service delivery environment for efficient service delivery. For example, this allows third-party developers to deliver and launch AES solutions' services in a matter of hours or minutes. The system management portal has the following automated set of generic and operations support system (OSS) capabilities: i) generic capabilities, ii) performance management capabilities, and iii) security management capabilities.

The generic capabilities include: i) automatic inventory management for applications and API usage for internal and external reporting, diagnostics, charging etc., ii) support for network elements audit control for auto-fault detection which further guides users through problem-solving scenarios, guaranteeing the greatest levels of productivity, iii) managed automatic and remotely controlled user access/capacities, iv) system management portal for prescriptive auto-overload controls, v) web GUI for monitoring in real time, the health, performance, security usages/utilization of ethical web services, and vi) network mapping capability.

The performance management capabilities include: i) automatically generate key performance indicator (KPI) reports (Web) which include system availability, request acceptance ratio, per process KPIs, average latency, granularity at protocol, interface, and application levels (reports are available on-demand and at scheduled intervals), ii) automatic and on-demand streaming of system capacity and resource usage collect measurements from network elements for process performance indications, and iii) automatic and remote controlled diagnostics of performance management issues.

The security management capabilities include: i) auto-sign-on via the system management portal to access all other network elements, ii) provide single interface for direct management of all network elements, and iii) auto-run prescriptive diagnoses by real-time self-detection of the vulnerable spots.

High Performance Portal using HTTP Proxylet container and protocol agnostic session context middleware:

The ingenuity of the AES reporting architecture is that it enables automatic collection of transaction/session detail records (TDRs/SDRs) from the solution components and auto-generation of analytics based on these TDRs/SDRs. Each component generates TDRs/SDRs at key points in a transaction/session (e.g., message sent/received, policy applied, etc.). These TDRs/SDRs get stored in a DB. Once the data is stored, various reports get created dynamically from the data. These reports can be exposed from the system and API monitoring and reporting control layer which controls which type of reports are visible to the user based on their role. However, all the reports are visible from the system management portal.

At a minimum, the following predefined reports get generated from the reporting engine on a daily, weekly, and monthly basis: i) access HTTP session/workflow transactions per second (TPS), ii) access Application/Campaign TPS, iii) network TPS, iv) northbound latency, iv) overall network latency, v) application/campaign status code, vi) application/campaign payload, and vii) service level agreement (SLA) TPS policy.

Portal Governance Repository

The system includes a virtualized and federated DB repository for AES related data. The single "logical" repository may consist of a number of "physical" DBs/repositories as mentioned below.

AES Portal Repositories

The AES portal repositories maintain at least the following data models for the functional operation of the AES solution: i) developer/partner and associated application data, and ii) API data. The developer/partner and associated application data is the on-boarding data that is needed to allow an application developed by a partner to access and use the AES APIs. The API data is the on-boarding and deployment data that is needed to deploy and manage an API in the AES solution. This data may include data such as, northbound API definition (uniform resource locator (URL), authentication method, etc.), associated policies, southbound enabler configuration data, the executable bundle for the API, associated utility and enabler executable bundles, the API self-documentation capability, etc.

Subscriber Data Cache

The subscriber data cache provides the capability to cache subscriber data within the AES solution as well as to virtualize access to the other subscriber data sources. This data may be needed for policy evaluation (policy context type) and may be used to expose subscriber data via an API to third-party applications.

Rules and Policy Repository

The rules and policy repository provides a "logical" central repository for rules and policies that is used to influence the execution of APIs. The actual rules and policy evaluation will be efficiently distributed across the run-time components to optimize the processing of the API invocation.

This disclosure allows qualified partners to deliver services, enablers, applications, context, feature/policy/rules bundles to the service provider for product catalogues such as web, mobile, TV, video portals, rich server/client etc. The disclosure provides architecture and functionality for a partner portal and a workflow designer engine and state modes supporting partner application web accessing.

Partner Portal Architecture Overview

Figure 3:
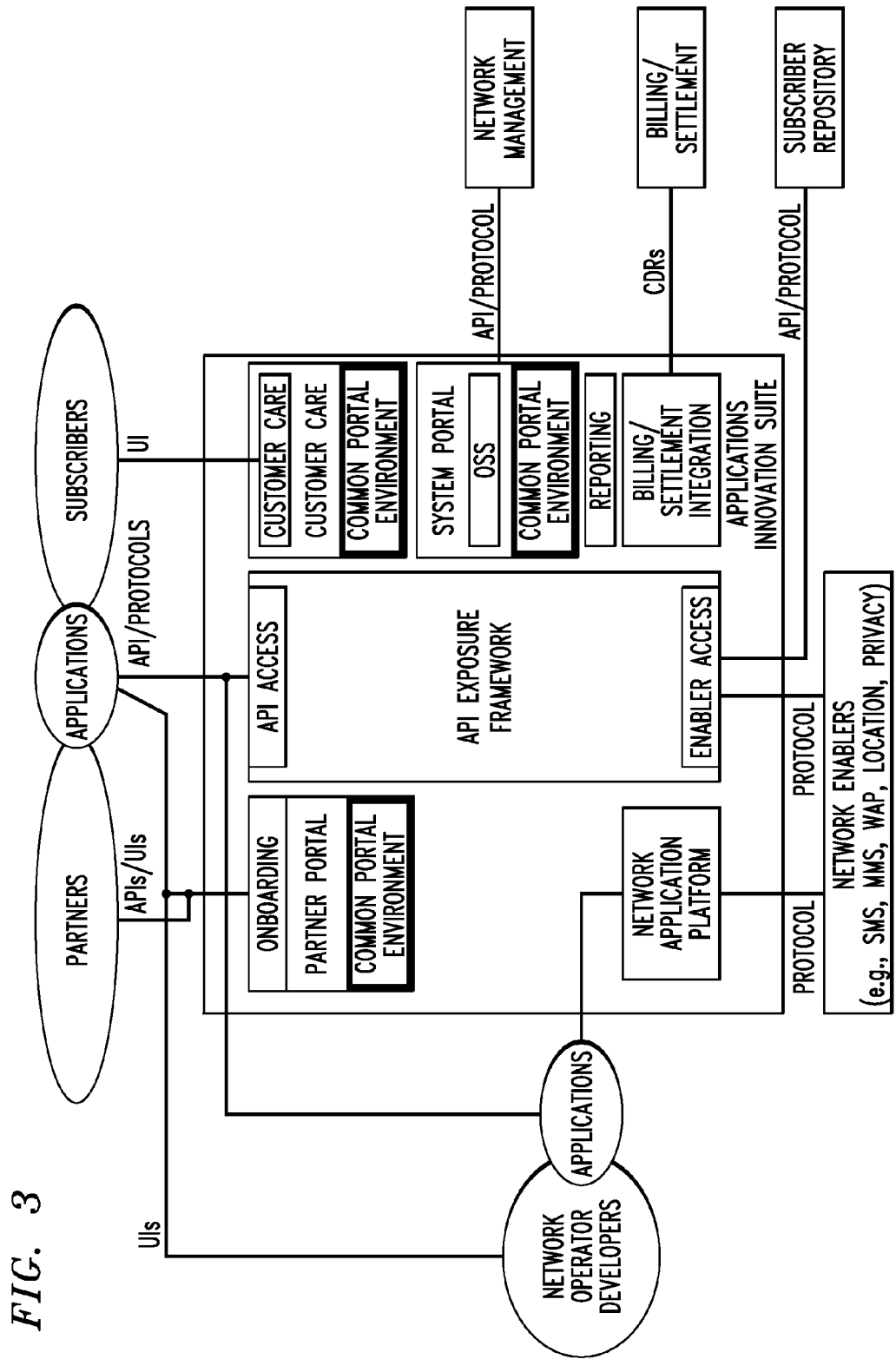
FIG. 3 is a block diagram of an exemplary embodiment of a system for managing components of an AES.
Figure 4:
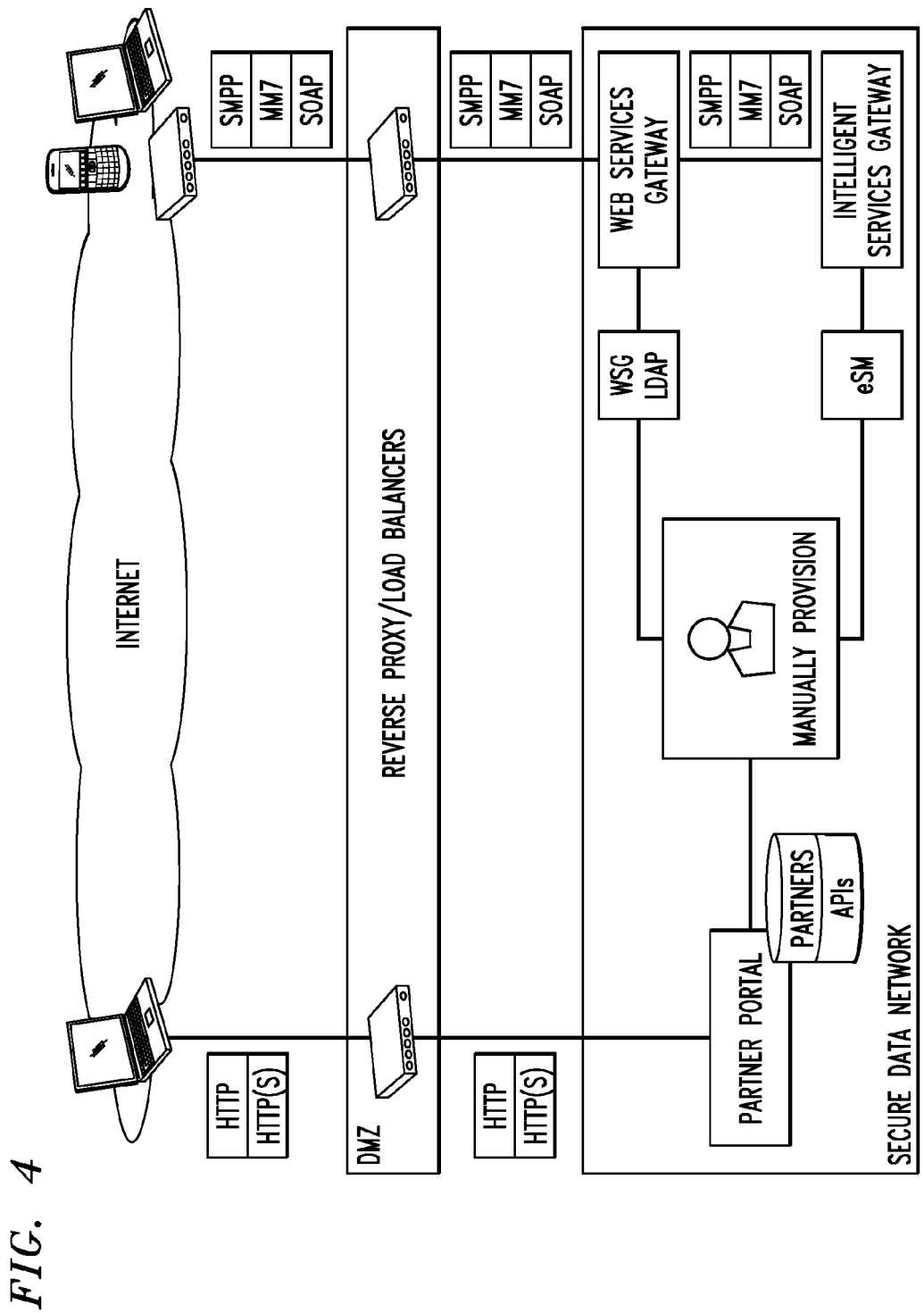
FIG. 4 is a block diagram of an exemplary architecture for an exemplary embodiment of a partner portal that facilitates managing components of an AES.

The partner portal enables value added applications and services to leverage rich and diverse network enablers deployed in various networks either directly or through an aggregation layer. FIG. 3 provides a block diagram of an exemplary embodiment of a system for managing components of an AES. FIG. 4 provides a block diagram of an exemplary architecture for an exemplary embodiment of a partner portal that facilitates managing components of an AES.

Figure 5:
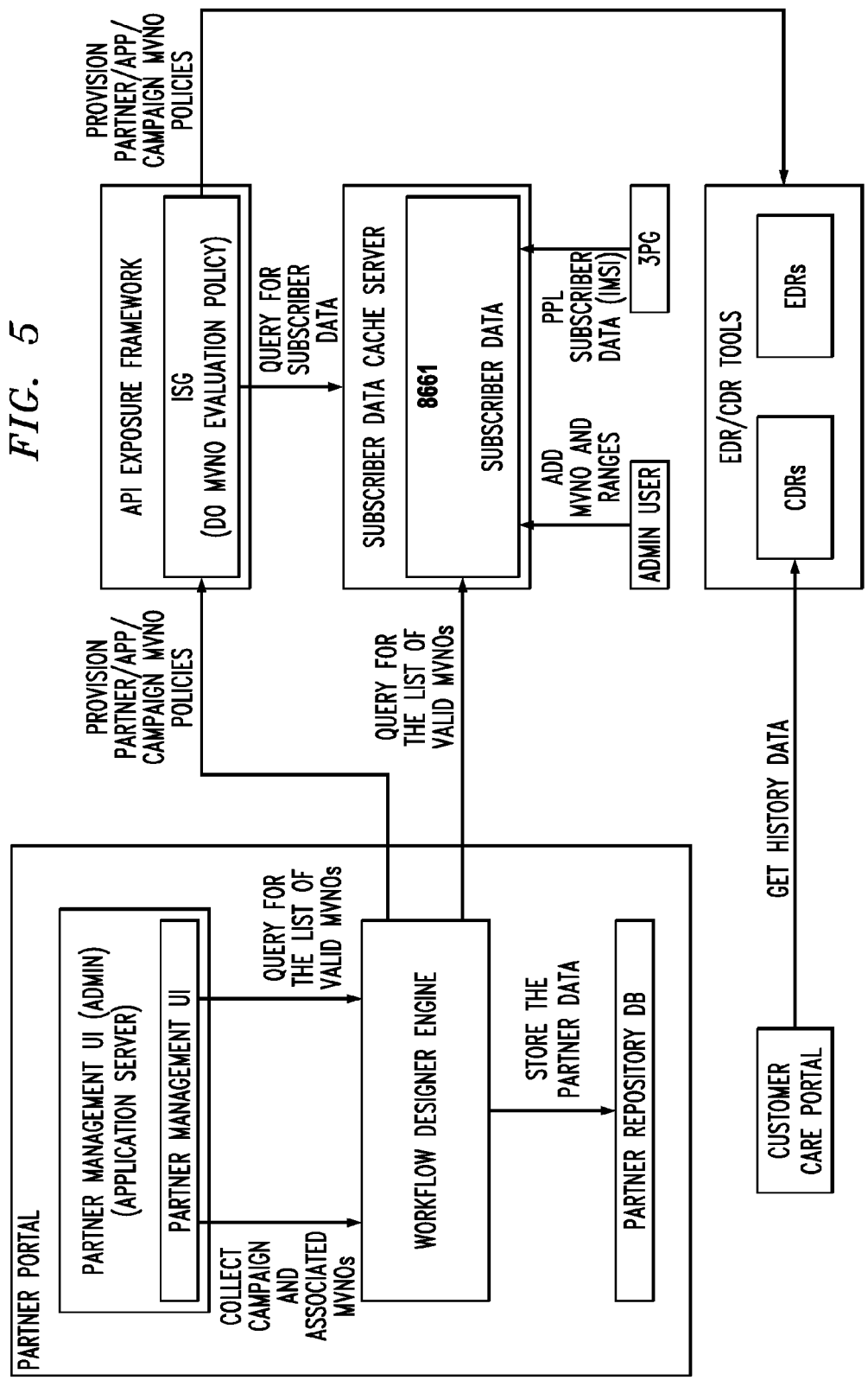
FIG. 5 is a block diagram of another exemplary embodiment of a system for managing components of an AES.

With reference to FIG. 5, a block diagram of another exemplary embodiment of a system for managing components of an AES provides further details about partner API governance and the work flow designer. The partner portal includes a partner-facing website that will be used to support the following functions in the AES: i) partner account registration and ii) partner management of a profile, applications, and campaigns.

In addition, the partner portal provides a set of pages that can be used by network operator personnel to manage partners, applications, and campaigns as well as administrator pages to manage the website. These pages along with a content management system comprise the presentation layer for the partner portal. Core business logic for the partner portal will be encapsulated in a partner process engine, which will expose this functionality via representational state transfer (REST) APIs.

Figure 6:
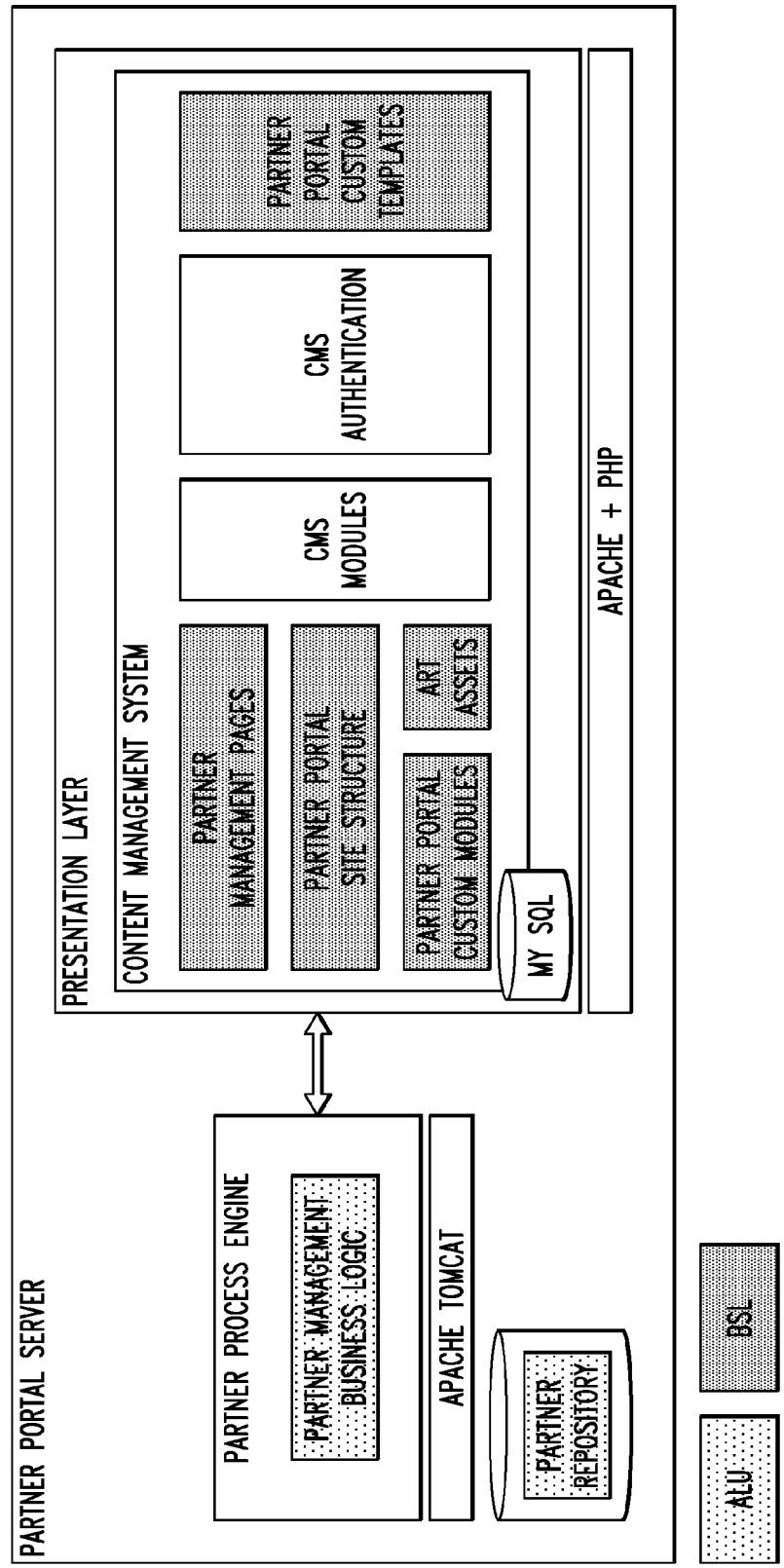
FIG. 6 is a block diagram of an exemplary embodiment of a partner portal that facilitates managing components of an AES.

With reference to FIG. 6, a block diagram of an exemplary embodiment of a partner portal that facilitates managing components of an AES shows a clean separation between core business logic and presentation layer. There is integration through the business logic layer to the API exposure framework.

The designer engine provides a centralized workflow tool for the network provider to manage the rules and policies associated with the partner portal. This component governs and controls the lifecycle of the rules/policies in the AES using exposed provisioning process APIs. The UI interfaces with the rule/policy management server to provide the following functionality: i) create/modify/delete rules/policies, ii) activate and deactivate rules/policies, iii) view the status of the rules/policies, and iv) provision the rules/policies in conjunction with partners and their application as well as APIs.

The rule/policy definitions will be maintained in a DB which may be part of rule/policy management server. Access to this repository will be through the rule/policy management APIs and associated provisioning processes. The API and partner parts of the partner portal use the API to determine what rule/policy data to collect during on boarding by the partner and/or administrator.

The API management and the rules/policy management parts of the partner portal have the same user log-in as the partner management part. Role and permissions are used to determine whether a given administrator has access to the API management part or policy management part.

Similarly, the workflow designer engine also provides a "Feature Manager" capability to create new entries for service, enabler, utility, and dashboard as well as associated rules/policies for them, such as: i) create feature dashboard, ii) create service, iii) create enabler, and iv) create utility.

Within the web-based UI, the system provides application manage/create/edit screens, widgets, wizards and mashups for the partners, social community developers, etc. Additionally, the system is designed to add new APIs to ensure that any fields or attributes that are required for a given interface are presented as actual fields within the enabler/services/applications related parameter configuration form. The system has the capability to collect these settings via a wizard designed uniquely for the API. The system provides API control governing whether support of MVNO is enabled in the system by designing the interfaces and logic for associating subscribers and campaigns to various MVNO owners/lists.

The partner portal resides in the secure data network managed by the network operator. Web traffic is directed to the partner portal through a reverse proxy and/or load balancers resident in the demilitarized zone (DMZ). The partner portal stores data gathered via web pages served from the partner portal into a locally managed DB referred to as the partner repository. This data can be extracted via a manual process and provisioned into an internet service gateway (ISG) and a wireless service gateway (WSG). Extraction of partner data is facilitated by partner portal, which provides both query access to the DB and a log of TDRs.

Partner Portal Tasks

Partners are able to perform the following tasks through the partner portal: a) self-register as a partner—a.1) complete the registration form and a.2) verify email address; b) reset a forgotten password; c) login as a partner; d) review/update profile information—d.1) change password and d.2) review/update default preferences that apply to all applications/campaigns; and e) manage applications/campaigns—e.1) add/update/delete applications/campaigns, e.2) specify application/campaign level preferences, and e.3) request approvals for application/campaign status changes.

Partner administrators are able to perform the following tasks through the partner portal: a) reset a forgotten password; b) login as a partner administrator; c) manage partners/applications/campaigns—c.1) add/update/delete partners, c.2) add/update/delete applications/campaigns for a given partner, c.3) specify default preferences that apply to all applications/campaigns for a given partner, c.4) specify application/campaign level preferences for a given application/campaign for a given partner, and c.5) approve application/campaign status changes for a given application/campaign for a given partner.

Site administrators are able to perform the following tasks through the partner portal: a) login as a site administrator; b) create/update/delete accounts for partner administrators, and c) administer partner portal content management system, including: c.1) manage general content for the site (add/modify articles, modules, etc.) and c.2) manage the look and feel for the site (via themes/templates and CSS).

Partner Portal Architectural Details

Figure 7:
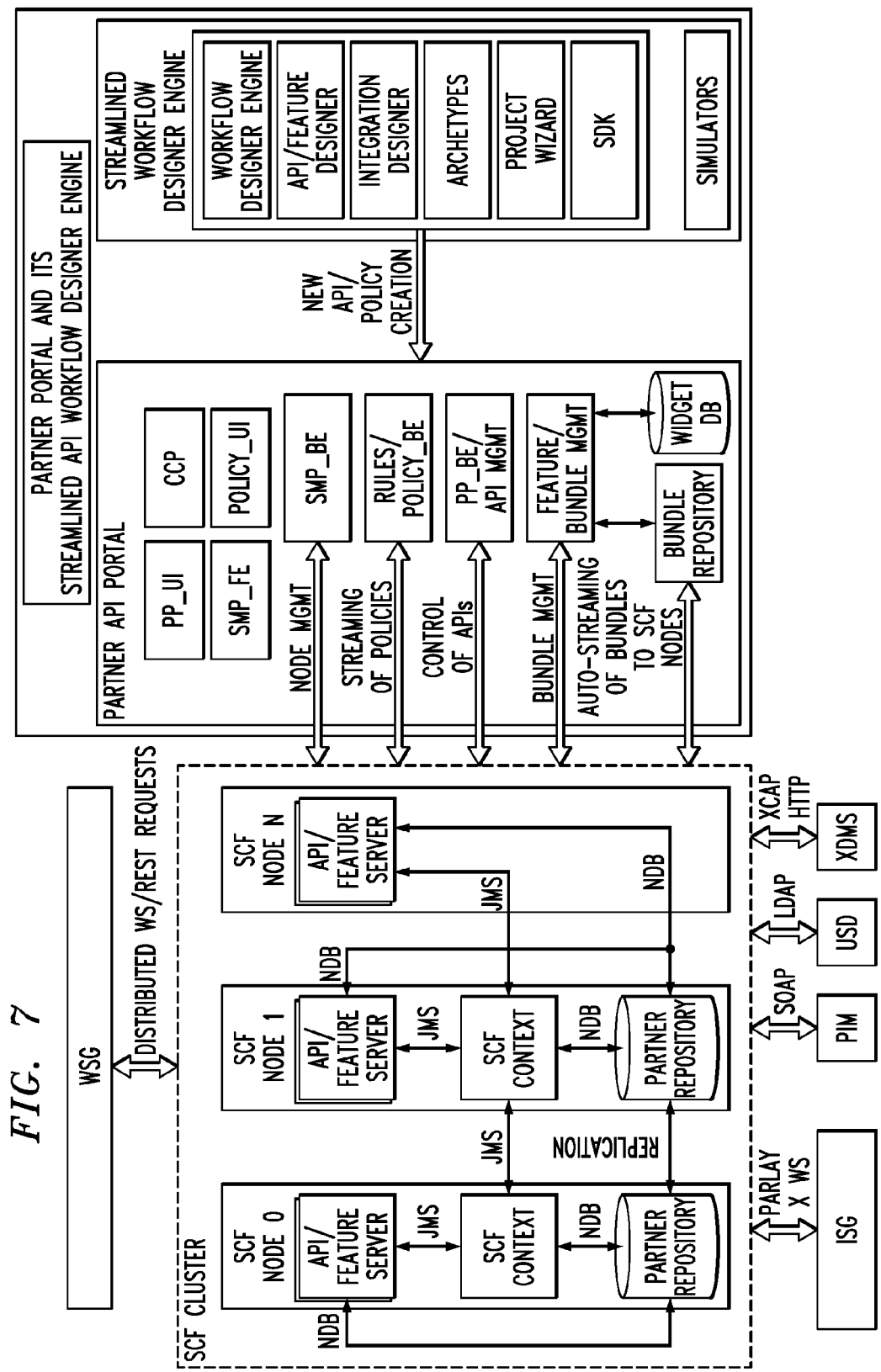
FIG. 7 is a block diagram of an exemplary architecture for an exemplary embodiment of a system for managing components of an AES.

With reference to FIG. 7, a block diagram of an exemplary architecture for an exemplary embodiment of a system for managing components of an AES shows how the partner portal enhances the following aspects: i) streamlined workflow design engine to create feature definitions and related context data into partner repository and SCF, ii) enhanced design engine to create SCF-based service/enabler/policy associations to partners, applications, campaigns and related context data into partner repository, iii) enhanced design engine to develop service/enabler/policy associations to partners, applications, campaigns and related context data into SCF, iv) enhanced design engine to develop web service definitions and access control for SCF-based services/enablers into WSG and DS, v) enhanced partner management UI and REST API supporting SCF-based service/enabler/policy associations to partners, applications, campaigns and related context data, vi) REST API for API/feature management (management of SCF-based services/enablers/policies), vii) REST API for component management (management of bundles in the production repository), and viii) enhanced administrative UI and API for EDR/TDR search.

Design Elements of Partner Portal and Workflow Designer Engine

Figure 8:
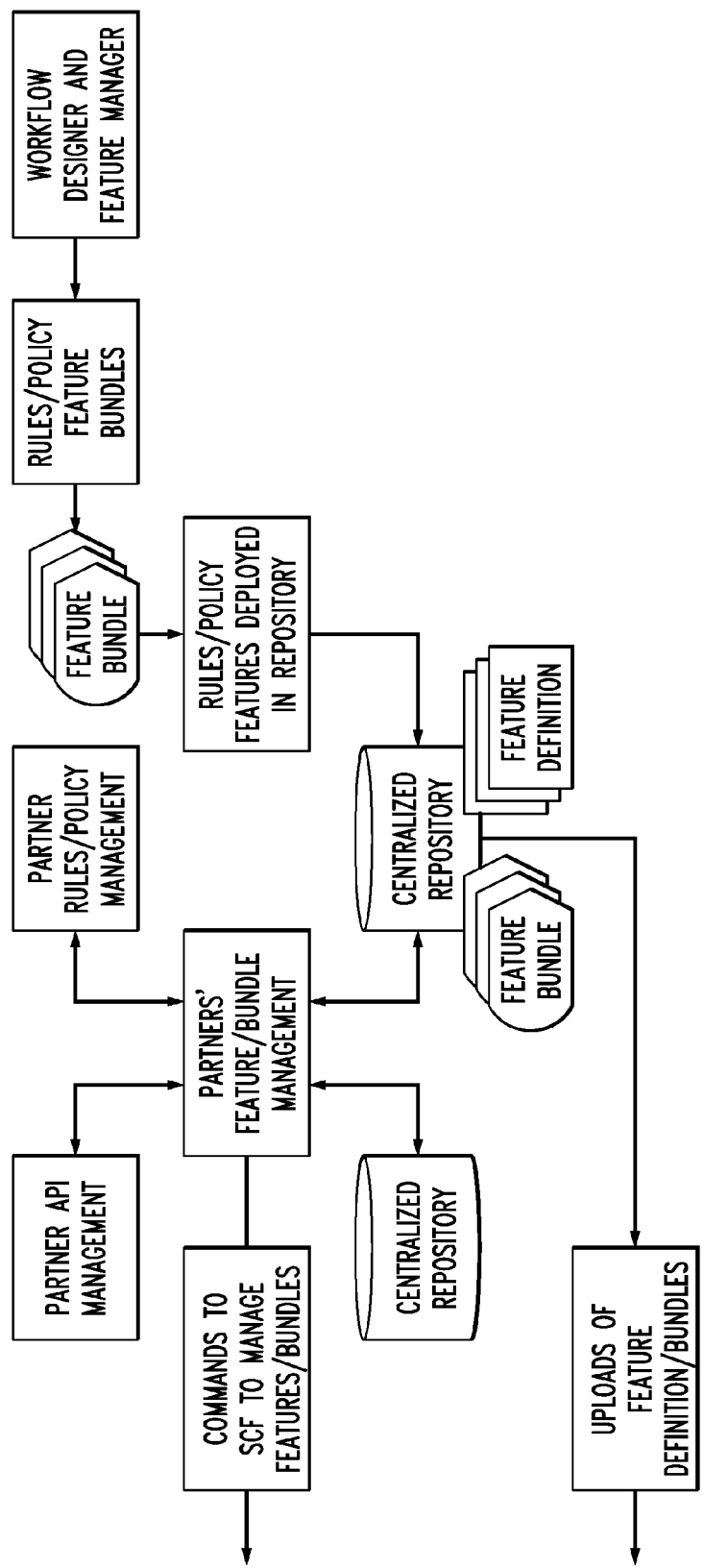
FIG. 8 is a functional diagram of an exemplary embodiment of a system for managing components of an AES.

With reference to FIG. 8, a functional diagram of an exemplary embodiment of a system for managing components of an AES shows the streamlined workflow designer engine. The workflow designer engine provides the following capabilities: i) design, create and develop workflows for rules, policies, contexts, services, features, widgets, wizards, mashups etc using visual designer/editor. These services are to be exposed to third-party applications. Services (including SIP based service brokering) run the application enablement composition engine; ii) create visual simulators, policy creation tools and local configuration management using service archetypes and source code repositories. Archetypes are basic composite definitions that allow developers to get a certain level of functionality "out of the box" for their composite API without having to do any work. Archetypes include different types of composite service design patterns like API transaction, notification etc.; iii) depending on chosen execution environment, workflow designer paradigms are different. Designer tools are specific to the execution environment of choice. For example, specific toolkits are dedicated to the service brokering capabilities; iv) contains HTTP proxylet container for high performance HTTP proxying and it has protocol-agnostic replicated session context middleware. Load balanced web server is also enabled; and v) debug, test and coordinate the deployment of the services to the other elements of the designer platform.

Additional capabilities of the streamlined workflow designer engine will include: (1) feature management, (2) functional aspect, and (3) component management.

Feature Management:

As seen in FIG. 8, the feature management configures and coordinates feature definitions to SCF containers as collections of rules/policy/feature bundles and provisions web service definitions for these features to WSG. Four distinct classes of feature are supported by feature management: i) services, ii) enablers, iii) policy, and iv) utility feature. The services class allows an application developer to design and create APIs that are then exposed to applications. The enablers class allows an application developer to implement access to a networked resource potentially used by multiple services. The policy class allows an application developer to design and generate rules sets governing the operation of services and enablers and are evaluated in a context-dependent manner. The utility feature class allows an application developer to design and synthesize a generic collection of bundles that implement an arbitrary generic utility available to services and enablers.

Functional Aspect:

The functional aspect allows an application developer to design, create and deploy partner portal web pages, processes, and interfaces to support introduction of the service composition framework. Functional aspect includes: i) auto-streaming of feature definitions for services, enablers, and policies into SCF, ii) auto-streaming of web service definitions for services and enablers into WSG, iii) administrative UI support for feature management and component management, iv) coordination of new TDRs to record feature management and component management-related events, and v) implement new measurements for performance monitoring of feature management and component management-related processing.

Component management includes: i) create and add production and snapshot repositories, ii) promote bundles (features, rules, policies, widgets, etc.) to production repository, iii) demote bundles to snapshot repository, iv) design and generate new deployment groups, v) update a given deployment group, vi) design and develop feature-based service/enabler-related parameters for a given partner, vii) design and build feature-based service/enabler-related parameters for a given application, and viii) design and create feature-based service/enabler-related parameters for a given campaign.

Details of Workflow Designer Engine and Task Flows

Figure 17:
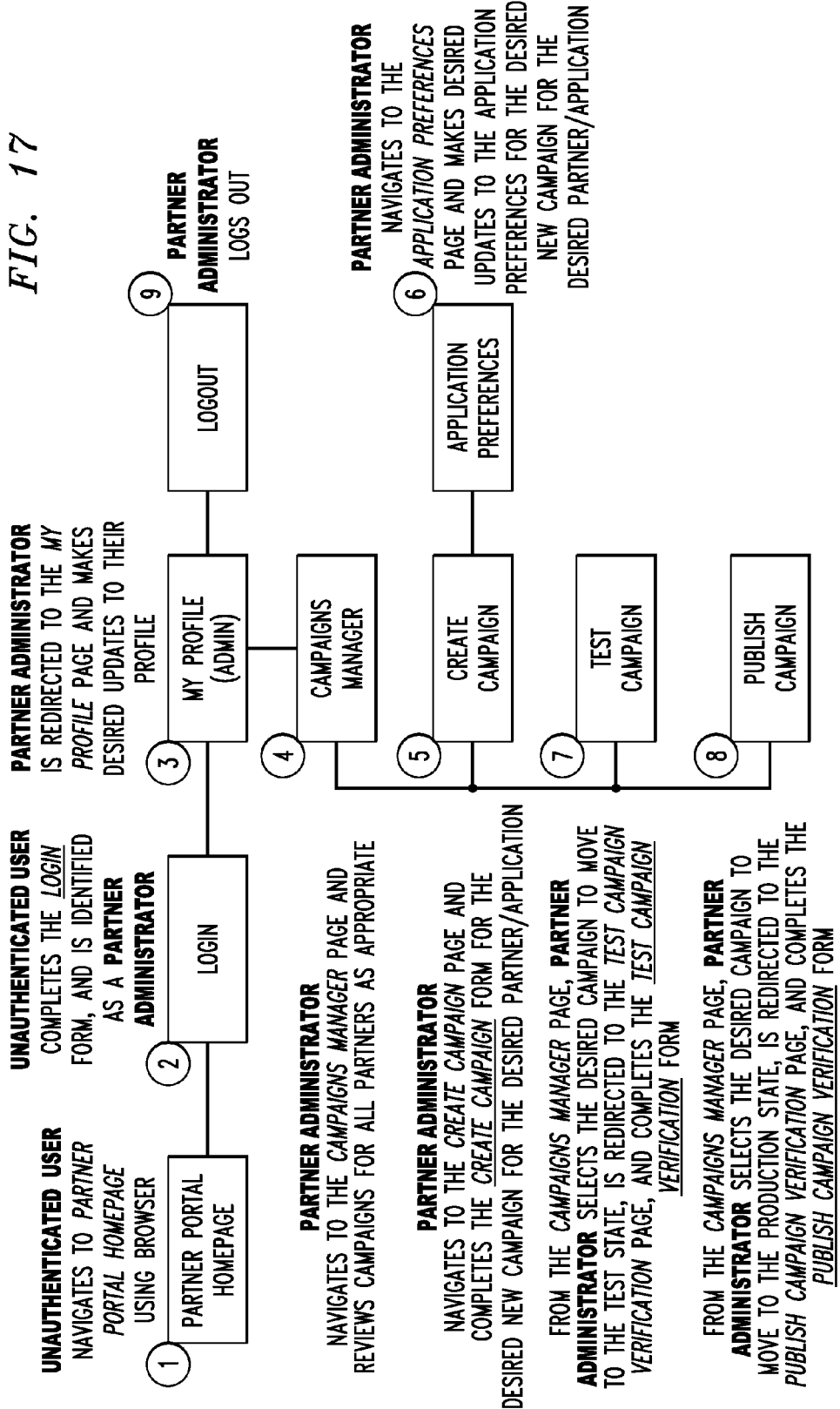
FIG. 17 is a flow chart of an exemplary process for partner administrator campaign management in a system for managing components of an AES.
Figure 18:
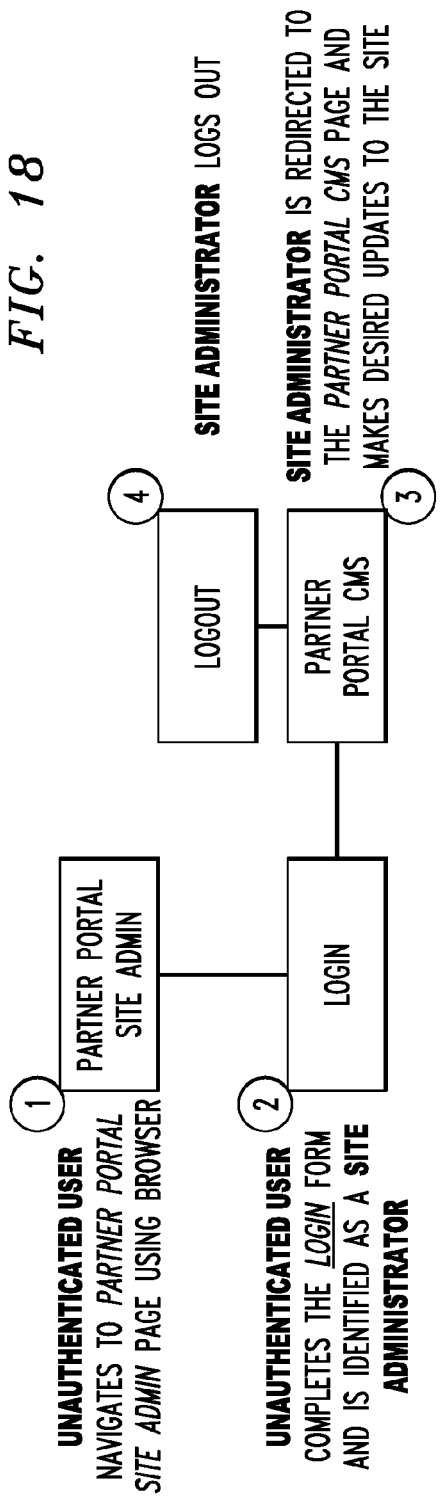
FIG. 18 is a flow chart of an exemplary process for site administrator login to a system for managing components of an AES.

The following task flows illustrate the primary set of flows for the partner portal for partner and partner administrator users: i) partner registration and first-time login flow (see FIG. 9); ii) partner forgot password flow (see FIG. 10); iii) partner application management flow (see FIG. 11); iv) partner campaign management flow (see FIG. 12); v) partner administrator login flow (see FIG. 13); vi) administrator forgot password flow (see FIG. 14); vii) partner administrator partner management flow (see FIG. 15); viii) partner administrator application management flow (see FIG. 16); ix) partner administrator campaign management flow (see FIG. 17); and x) site administrator login flow (see FIG. 18).

Figure 9:
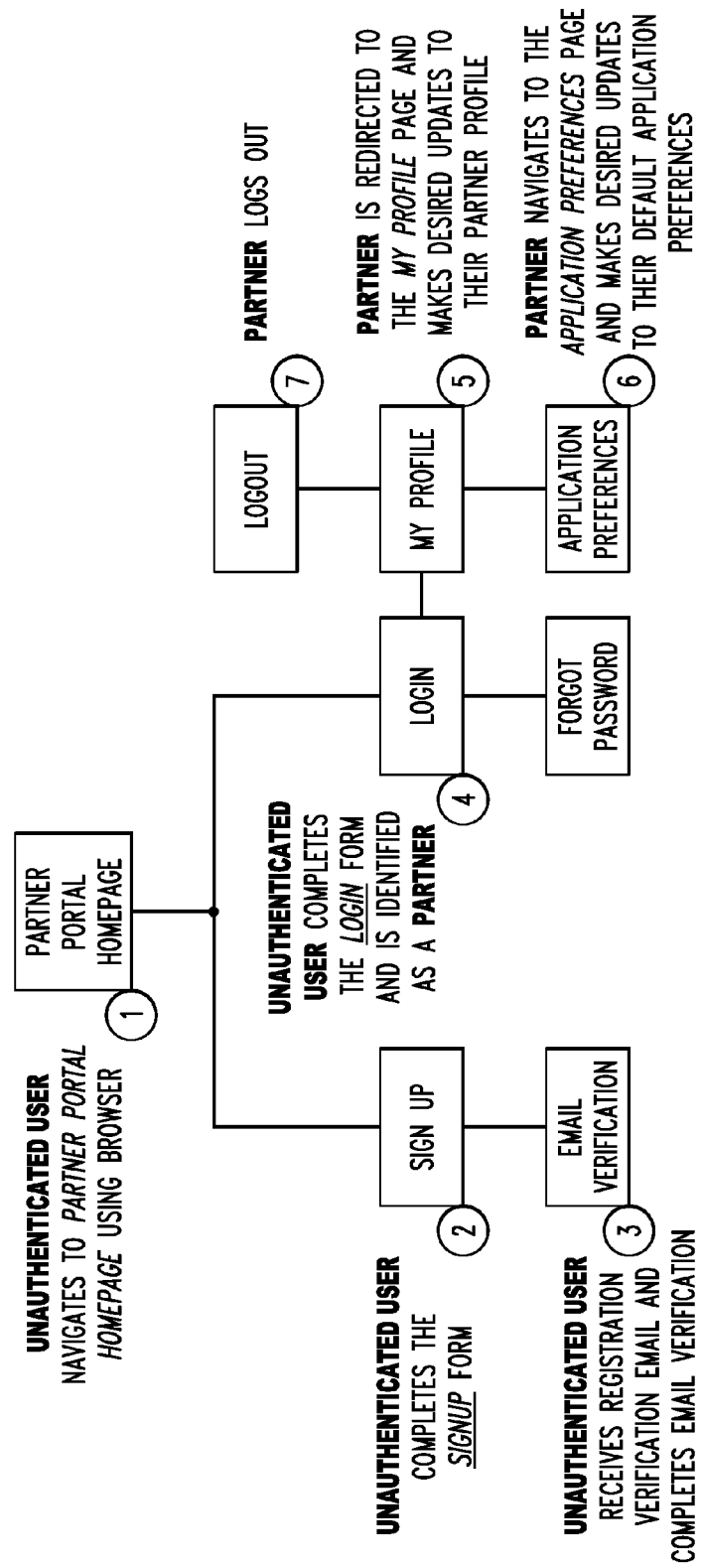
FIG. 9 is a flow chart of an exemplary process for partner registration and first-time login to a system for managing components of an AES.
Figure 10:
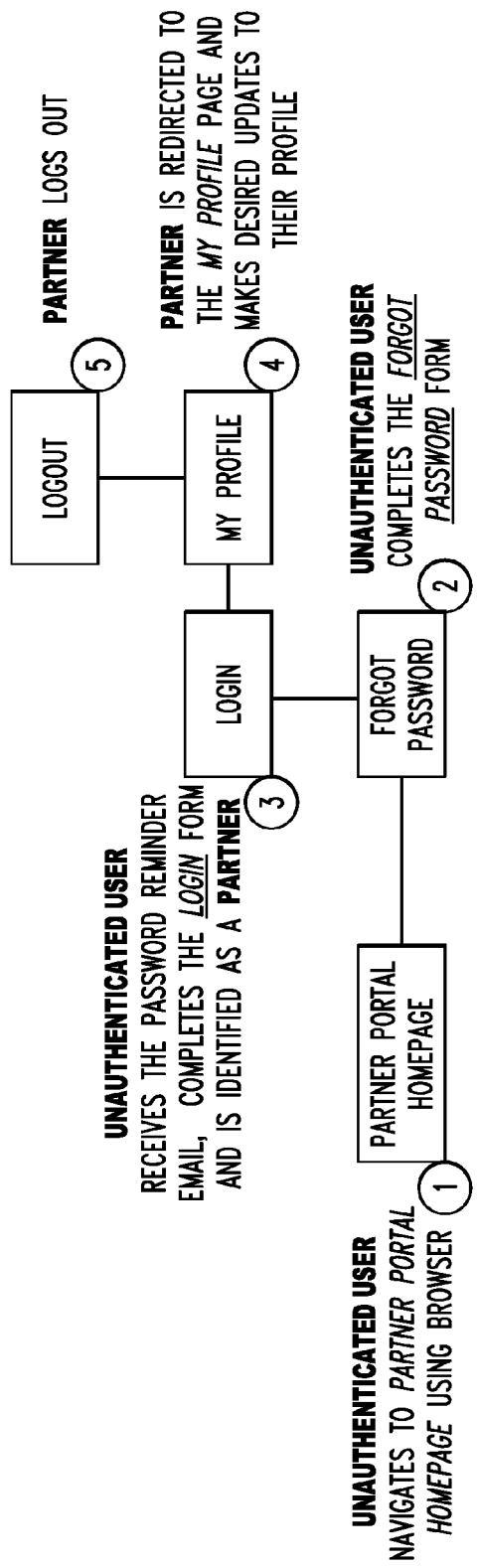
FIG. 10 is a flow chart of an exemplary process for handling a partner that forgot a password for login to a system for managing components of an AES.
Figure 11:
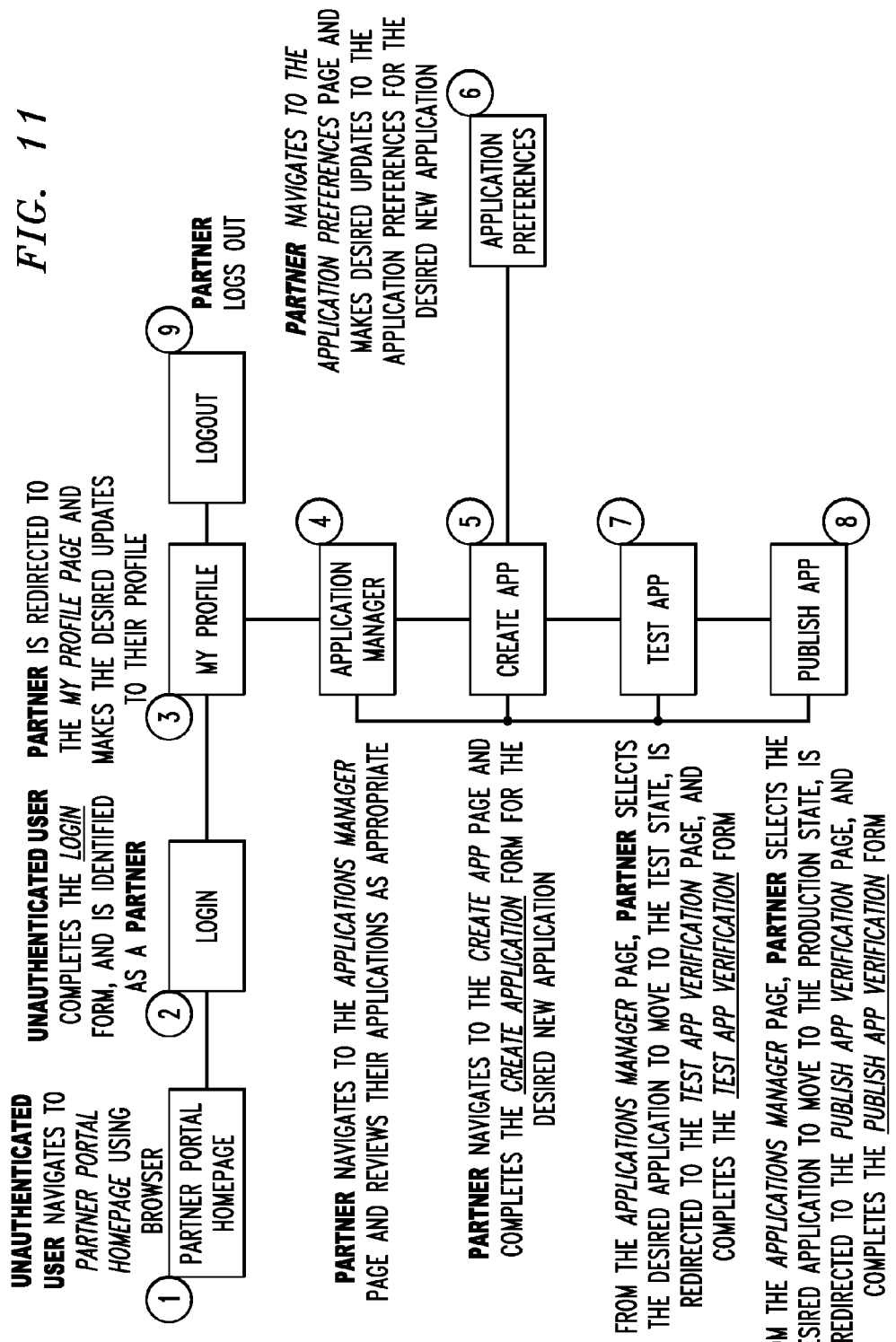
FIG. 11 is a flow chart of an exemplary process for partner application management in a system for managing components of an AES.
Figure 12:
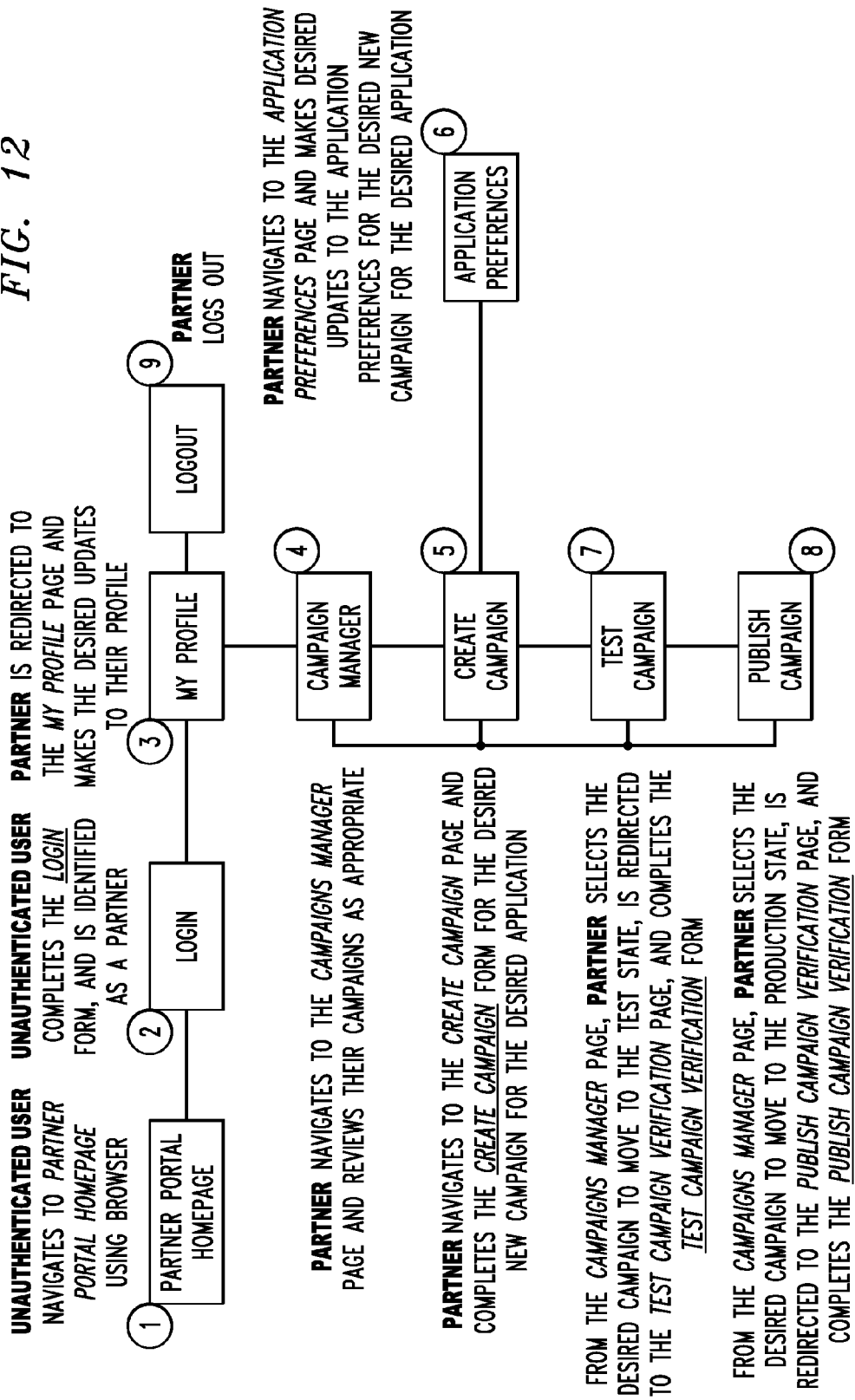
FIG. 12 is a flow chart of an exemplary process for partner campaign management in a system for managing components of an AES.

FIG. 9 provides a flow chart of an exemplary process for partner registration and first-time login to a system for managing components of an AES. FIG. 10 provides a flow chart of an exemplary process for handling a partner that forgot a password for login to a system for managing components of an AES. FIG. 11 provides a flow chart of an exemplary process for partner application management in a system for managing components of an AES. FIG. 12 provides a flow chart of an exemplary process for partner campaign management in a system for managing components of an AES.

Figure 13:
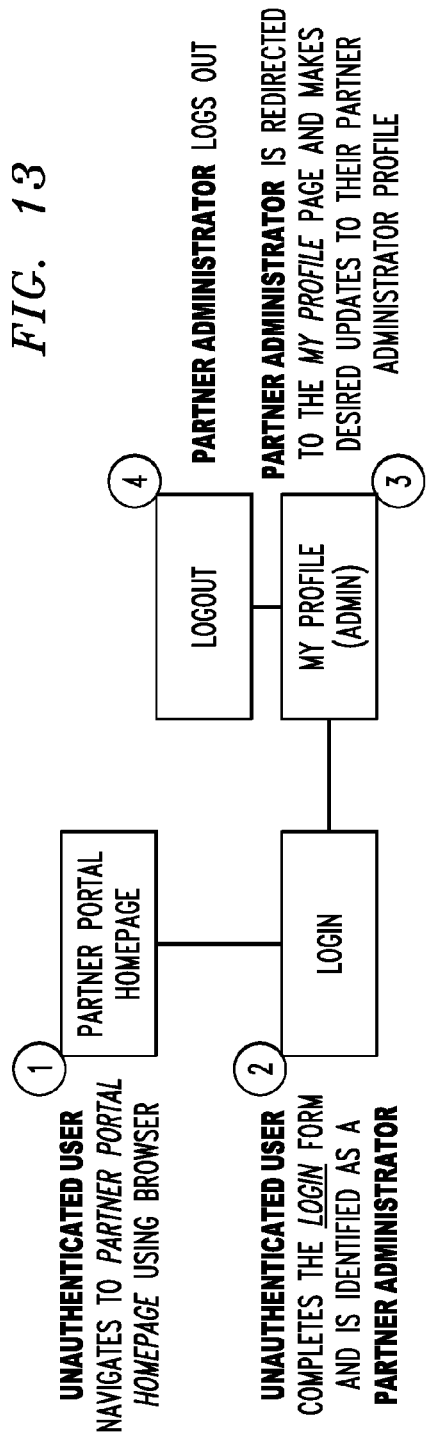
FIG. 13 is a flow chart of an exemplary process for partner administrator login to a system for managing components of an AES.
Figure 14:
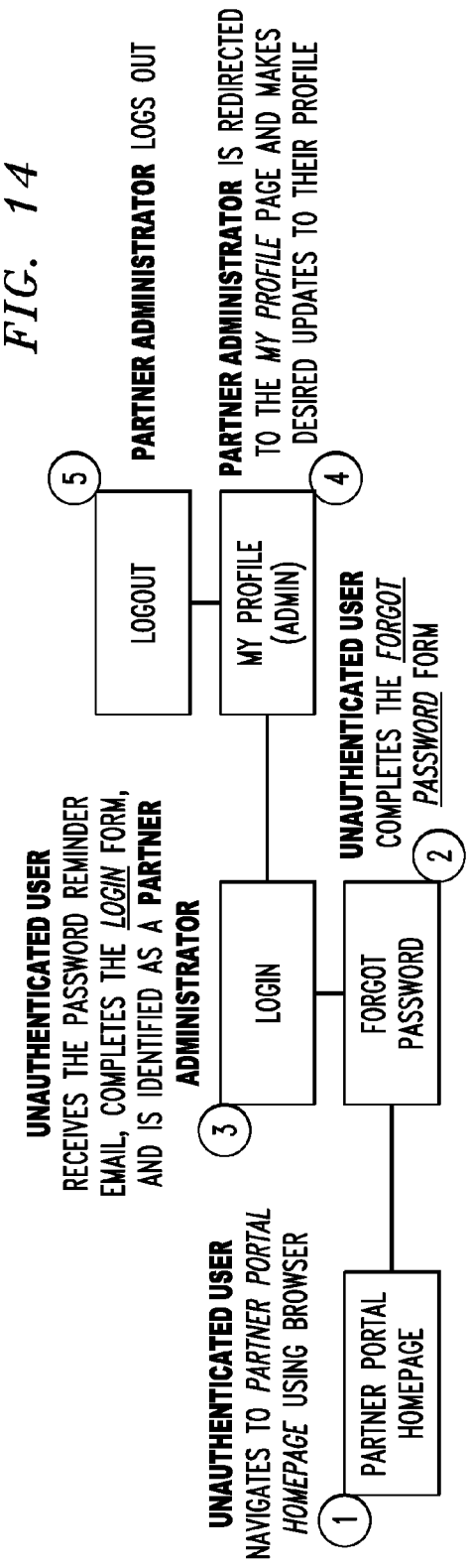
FIG. 14 is a flow chart of an exemplary process for handling a partner administrator that forgot a password for login to a system for managing components of an AES.
Figure 15:
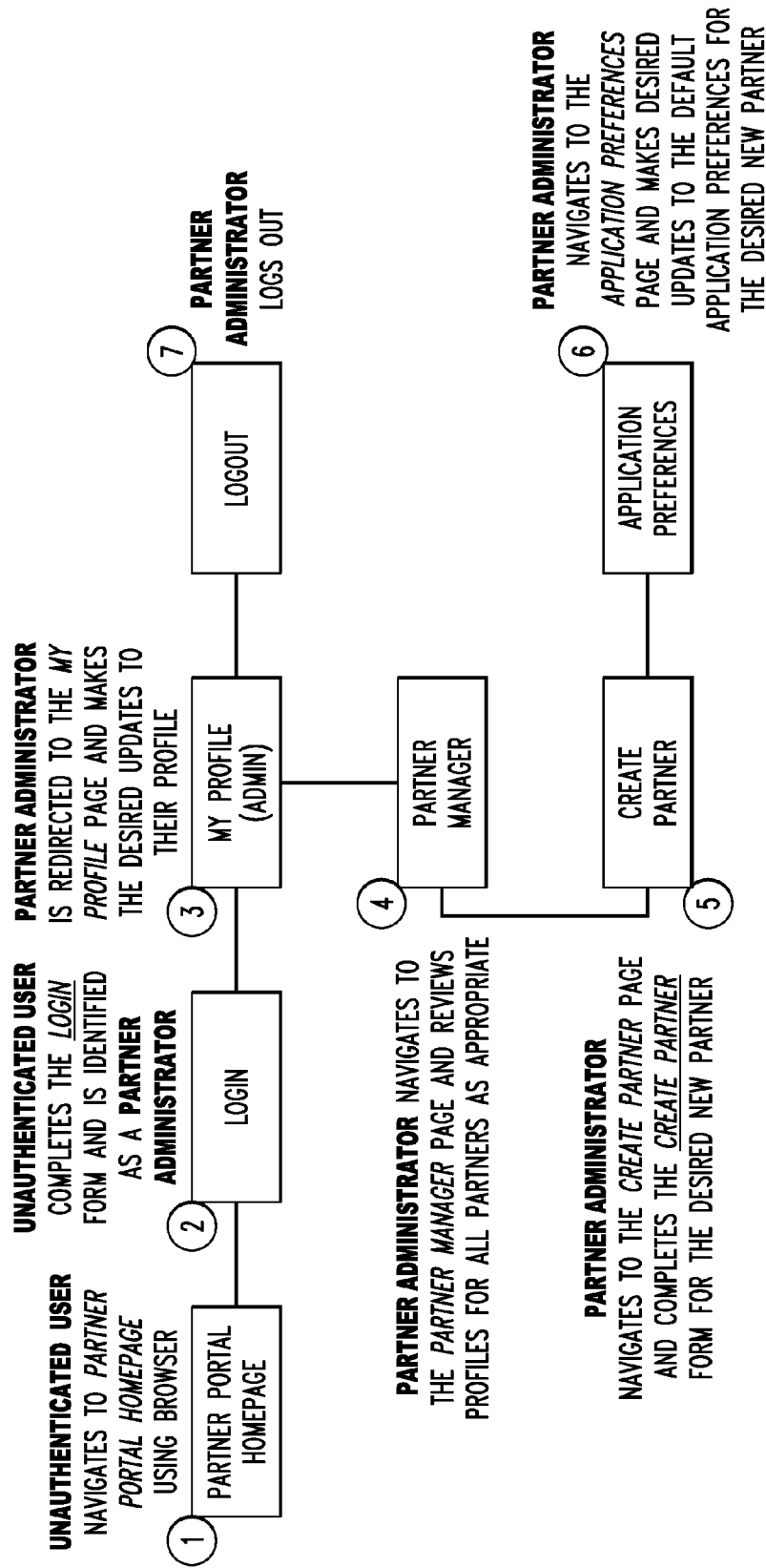
FIG. 15 is a flow chart of an exemplary process for partner management by a partner administrator in a system for managing components of an AES.
Figure 16:
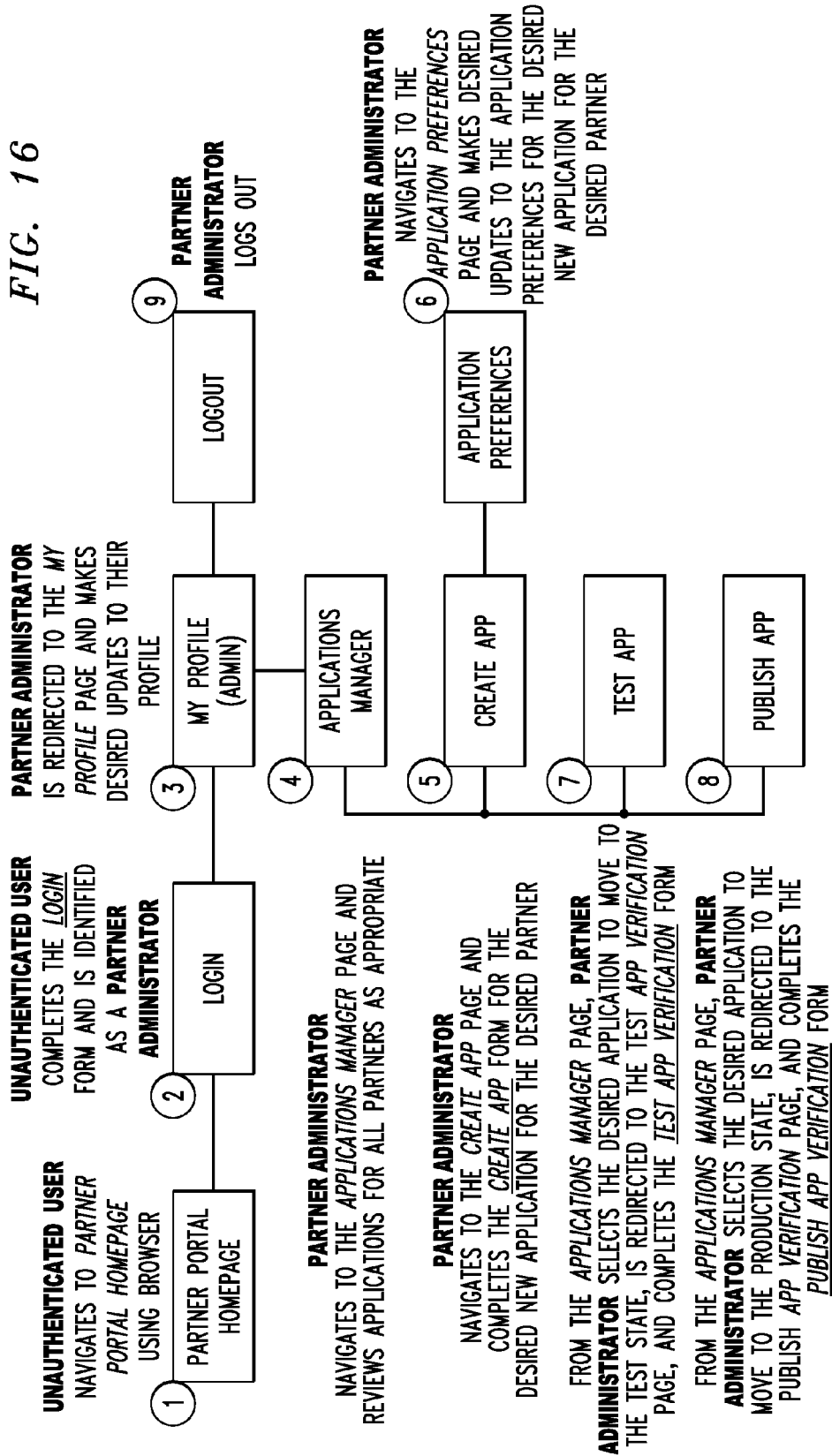
FIG. 16 is a flow chart of an exemplary process for partner administrator application management in a system for managing components of an AES.

FIG. 13 provides a flow chart of an exemplary process for partner administrator login to a system for managing components of an AES. FIG. 14 provides a flow chart of an exemplary process for handling a partner administrator that forgot a password for login to a system for managing components of an AES. FIG. 15 provides a flow chart of an exemplary process for partner management by a partner administrator in a system for managing components of an AES. FIG. 16 provides a flow chart of an exemplary process for partner administrator application management in a system for managing components of an AES. FIG. 17 provides a flow chart of an exemplary process for partner administrator campaign management in a system for managing components of an AES.

FIG. 18 provides a flow chart of an exemplary process for site administrator login to a system for managing components of an AES.

Additional Partner Portal Functionality

The partner portal determines which of the following access levels apply based on user authentication: i) access to public content only, available to unauthenticated users, ii) access to partner-level and partner-specific content in addition to public content, available to authenticated partners, iii) access to site partner administrator-level content in addition to public content, available to authenticated partner administrators, and iv) access to content management system features, available to authenticated site administrators. Partner-level content is content to which any authenticated partner has access, whereas partner-specific content is content specific to the actual partner and for which only the partner that has been authenticated has access.

The partner portal incorporates a content management system that is available to site administrator users to perform the following tasks: a) login as site administrator; b) create/update/delete accounts for partner administrators; c) administer partner portal content management system, including: c.1) manage general content for the site (add/modify articles, modules) and c.2) manage the look and feel for the site (via themes/templates and CSS).

The partner portal implements the following form validation for any partner and partner administrator accessible page in response to form submission events: i) verify that all required fields for the form are present, ii) verify that all values specified for enumerated value fields are in the correct range, and iii) any requests to delete a partner, application, or campaign shall be explicitly confirmed.

The partner portal processes deletion requests for partners, applications, and campaigns per the following: i) deletion of a partner results in automatic deletion of all associated applications and campaigns, ii) deletion of an application results in automatic deletion of all campaign associations; however, the campaigns themselves must not be deleted, and iii) deletion of a campaign results in automatic deletion of all application associations; however, the applications themselves must not be deleted.

The partner portal supports both HTTP and HTTP(S) access for the following classes of traffic: i) page requests from partners, partner administrators, and site administrators and ii) requests initiated by partner portal in executing business logic for partner, application, and campaign management. The partner portal implements tools to manage and install SSL site certificates. The partner portal implements protections against SQL injection attacks.

Partner Portal State Modes

Figure 19:
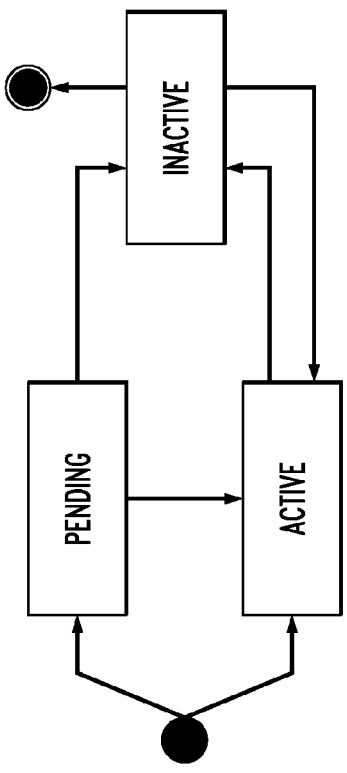
FIG. 19 is a state diagram of an exemplary state model for a partner in a system for managing components of an AES.
Figure 20:
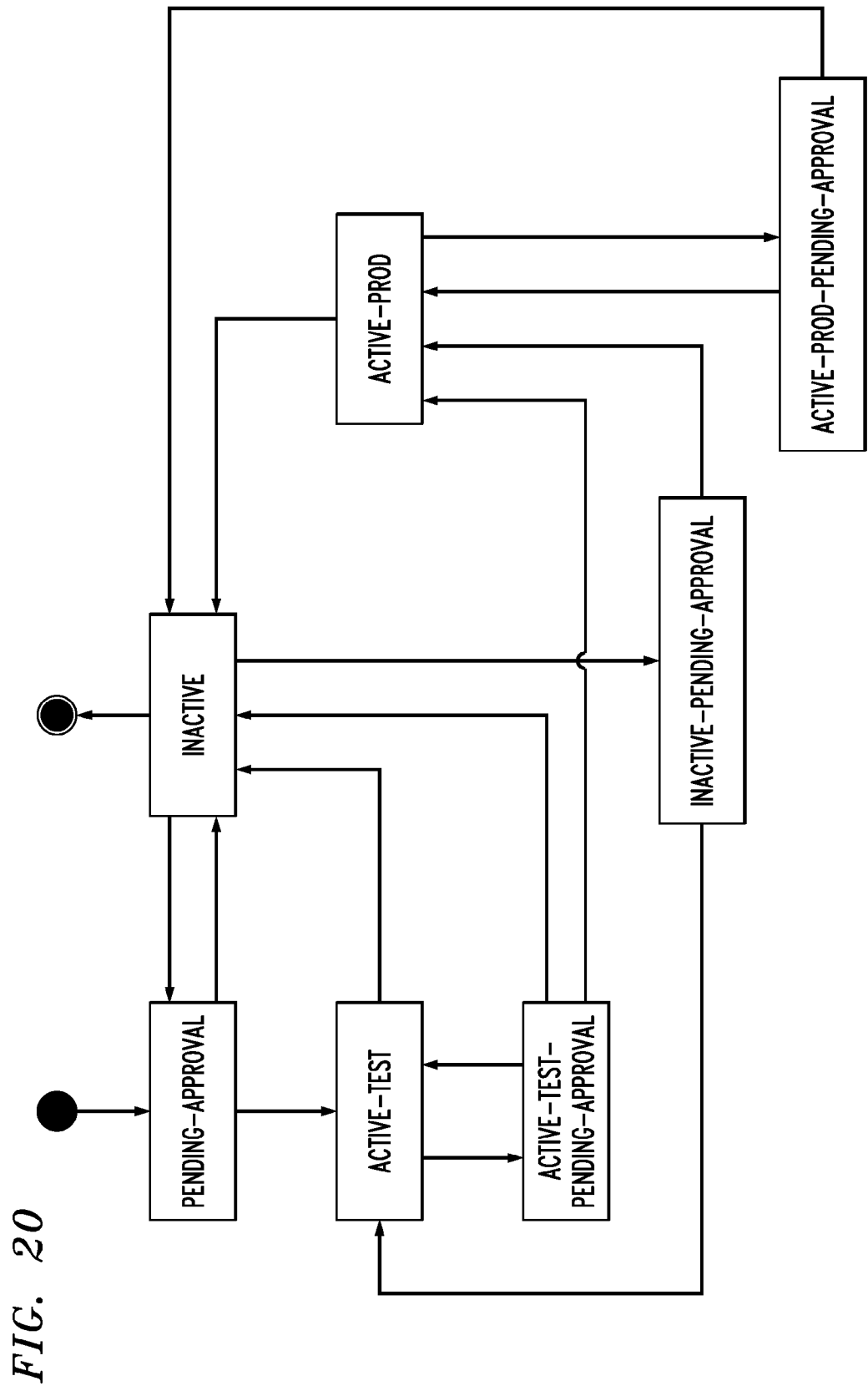
FIG. 20 is a state diagram of an exemplary state model for an application in a system for managing components of an AES.
Figure 21:
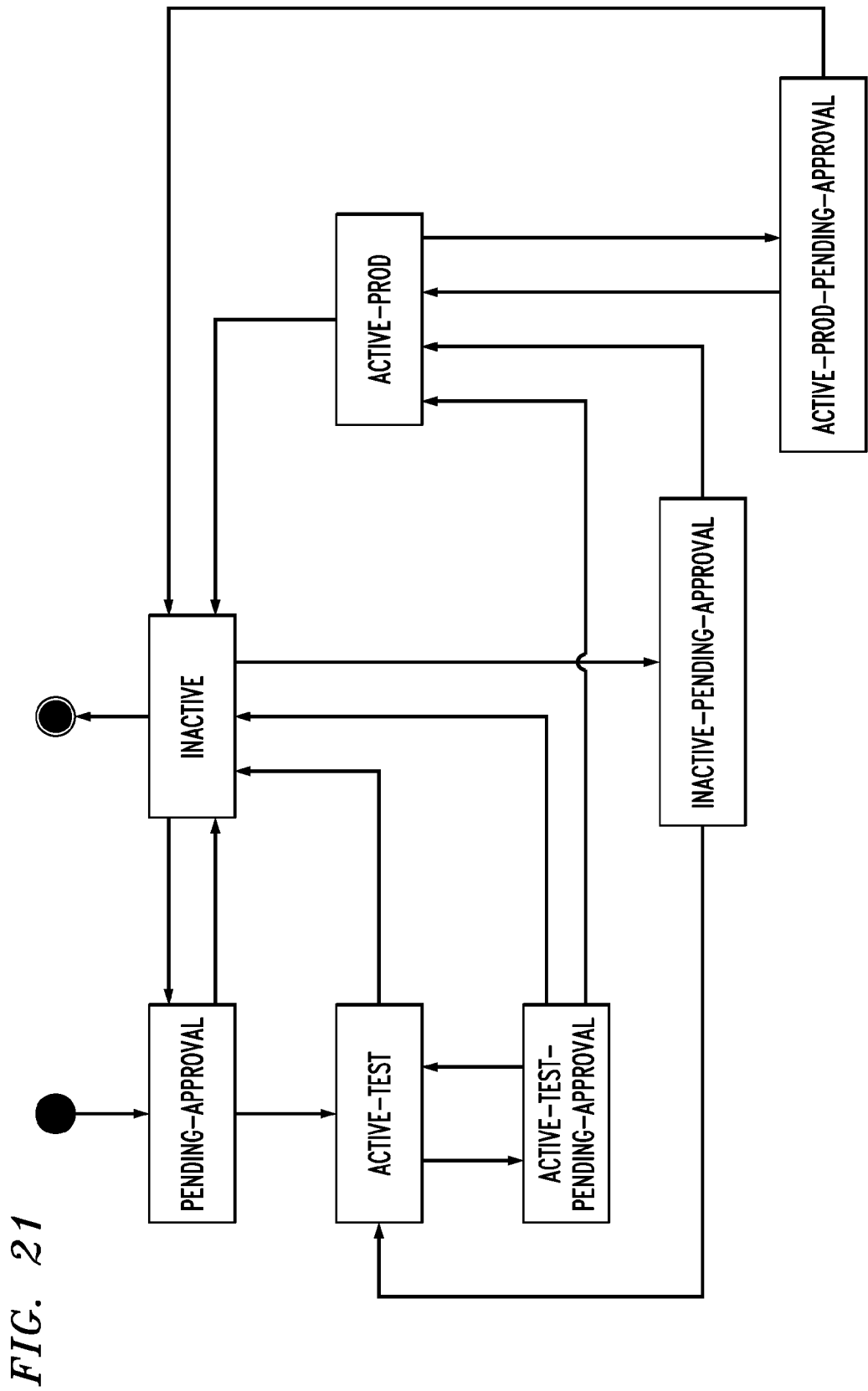
FIG. 21 is a state diagram of an exemplary state model for a campaign in a system for managing components of an AES.

The partner portal implements the following checks when processing partner, application, or campaign management requests: a) for any request to update a partner, application, or campaign, verify that the partner, application, or campaign requested for update exists, b) for any request to delete a partner, application, or campaign, verify that the partner, application, or campaign requested for deletion exists, and c) for any request to transition the state of a partner, application, or campaign, verify that the state change is consistent with the following diagrams describing the allowed state transitions: c.1) partner state model (see FIG. 19); c.2) application state model (see FIG. 20); and c.3) campaign state model (see FIG. 21). FIG. 19 provides a state diagram of an exemplary state model for a partner in a system for managing components of an AES. FIG. 20 provides a state diagram of an exemplary state model for an application in a system for managing components of an AES. FIG. 21 provides a state diagram of an exemplary state model for a campaign in a system for managing components of an AES.

Use-Cases and Wireframes for the Creation of Services/Policies/Enablers/Utilities for Partners:

Partner Management Scenario.

The generation of service/enabler-related parameters for a given partner includes: a) partner/developer/operator logs in to partner portal and workflow designer and navigates to partner preferences; b) workflow designer engine provides the visual designer editor tool to create mashups of new services/enablers/applications compatible with the partner type, including SCF and ISG-hosted services/enablers; c) partner designs, models and generates services/enablers/applications that the given partner desires to use for the desired context type. The workflow designer engine in turn creates service archetypes and source code repositories for these new services/enablers/applications for a given partner; d) partner or partner administrator configures partner-level settings for selected services/enablers using forms generated from service-context or enabler-context metadata—d.1) partner portal lists policies associated with given services/enablers for the policies that are allowed to be configured for partners/applications/campaigns; d.2) partner/developer selects the policies that the given partner desires to use; and d.3) partner configures partner-level policy settings for selected policies using policy-specific forms generated from policy context metadata; e) partner saves partner preferences for the given partner; and f) partner portal persists the state of the partner to the partner repository in the partner portal database.

FIG. 22 provides a drawing of an exemplary screen design for a create/edit policy function associated with feature management in a system for managing components of an AES. FIG. 23 provides a drawing of an exemplary screen design for a create/edit service function associated with feature management in a system for managing components of an AES.

Partner Management Scenario

The generation of new service/enabler/policy/rule/widget and related parameters for a new application include; a) partner/developer/operator logs in to partner portal and workflow designer and navigates to partner preferences; b) workflow designer engine provides the visual designer editor tool to create new services/enablers/policies/rules/widgets etc for a given new application type and partner type, including SCF and ISG-hosted services/enablers; c) partner/developer/operator selects an application associated with a given partner and invokes the edit action thus creating a new application for a mashup of contexts. The workflow designer engine in turn creates service archetypes and source code repositories for this new application for a given partner; d) partner/developer then generates the new services/enablers/applications that the given partner desires to use; e) partner configures application-level settings for selected services/enablers using forms generated from service-context or enabler-context metadata—e.1) partner portal lists policies associated with given services/enablers for the policies that are allowed to be configured for partners/applications/campaigns; e.2) partner administrator selects the policies that the given partner desires to use; and e.3) partner administrator configures application-level policy settings for selected policies using policy-specific forms generated from policy context metadata; f) partner or partner administrator saves the application; and g) partner portal persists the state of the application to the partner repository in the partner portal database.

FIG. 24 provides a drawing of an exemplary screen design for a create/edit enabler function associated with feature management in a system for managing components of an AES. FIG. 25 provides a drawing of an exemplary screen design for a create/edit utility feature function associated with feature management in a system for managing components of an AES.

Partner Management Scenario

The configure service/enabler-related parameters for a given campaign include: a) partner/developer/operator logs in to partner portal and workflow designer and navigates to partner preferences; b) workflow designer engine provides the visual designer editor tool to create new services/enablers/policies/rules/widgets etc for a new campaign type and partner type, including SCF and ISG-hosted services/enablers; c) partner selects a campaign associated with a given partner and invokes the edit action, thus creating a new campaign for mashup of enablers, services and applications. The workflow designer engine in turn creates service archetypes and source code repositories for this new campaign for a given partner; d) partner or partner administrator selects the services/enablers that the given partner desires to use; e) for any deployed composite APIs, partner or partner administrator configures campaign-level API settings for selected services/enablers using forms generated from service-context or enabler-context metadata e.1) partner portal lists policies associated with given services/enablers for the policies that are allowed to be configured for partners/applications/campaigns; e.2) partner administrator selects the policies that the given partner desires to use; and e.3) partner administrator configures campaign-level policy settings for selected policies using policy-specific forms generated from policy context metadata; f) partner or partner administrator saves the campaign; and g) partner portal persists the state of the campaign to the partner repository in the partner portal database.

FIG. 26 provides a drawing of an exemplary screen design for a policy parameters function associated with feature management in a system for managing components of an AES. FIG. 27 provides a drawing of an exemplary screen design for a management/accounting parameters function associated with feature management in a system for managing components of an AES.

Feature Management Use-case Design Scenarios:

The creation of a new feature definition includes: i) feature administrator logs in to partner portal and navigates to the feature management dashboard, ii) feature administrator invokes the add action specific to the type of feature being added (i.e., add service, add enabler, add policy, or add utility feature), iii) feature administrator creates a new feature definition of the desired type through the visual designer editor of the workflow designer engine. The workflow designer engine in turn creates service archetypes and source code repositories for this new feature for a given partner; iv) feature administrator saves the new feature definition, v) partner portal registers the feature definition with a generated feature ID by adding it to the feature repository in the partner portal database; and vi) the repository administrator then approves bundles and publishes them into the production repository so that they are available to use in feature definitions. If any dependency cannot be resolved when saving the feature definition (e.g., if a required feature has been deleted from the feature repository or a required bundle has been deleted from the repository) it will fail with an error.

The browsing of feature definitions includes: i) feature administrator logs into partner portal and navigates to the feature management dashboard; ii) feature administrator browses through registered feature definitions with ability to sort by feature ID, feature name, and feature type; to filter by feature state and feature type; and to browse across multiple pages of feature definitions; and iii) feature administrator finds the desired feature definition (if necessary using search capability to search by feature ID, feature name, or feature type) and invokes the desired action.

The managing state of a given feature includes: i) feature administrator browses feature definitions and invokes the activate or deactivate action for a given feature; ii) partner portal performs the appropriate actions to update the state of the feature based on the current deployment state, the desired administrative state, and the feature type associated with the given feature; and iii) partner portal updates the partner portal UI to reflect the current state of the feature within the system. If any dependency cannot be resolved during deployment of the feature, deployment of the feature will fail with an appropriate error message.

The updating of a given feature definition includes: i) feature administrator browses feature definitions and invokes the update feature action for a given feature; ii) feature administrator reviews current settings for the given feature; iii) feature/policy administrator updates desired settings for the given feature; iv) feature administrator saves the updated feature definition; v) partner portal updates the registered feature definition for the appropriate feature ID by updating the feature repository in the partner portal database; and vi) If the updated feature definition impacts any deployed feature, partner portal invokes performs the appropriate provisioning and management actions on the impacted runtime elements.

The deleting of a given feature definition includes: i) feature administrator browses feature definitions and invokes the delete action for an a given feature; ii) partner portal determines that there are no dependencies on the feature to be deleted; and iii) partner portal removes the feature definition from the feature repository. If any feature is dependent on the feature to be deleted, partner portal returns a warning message. Feature administrator should review the warning and indicate whether they want to ignore the dependencies. If not, feature administrator should review the details for features having dependencies on the feature to be deleted, and manually remove each reference. This may impact or require a change in the administrative and/or operational state of the impacted features.

Auto-Deployment Management Scenarios:

The auto-browse of deployment groups includes: i) feature administrator logs in to partner portal and navigates to the deployment management dashboard; ii) configured deployment groups appear on dashboard automatically sorted out by deployment group name and deployment group ID across multiple pages of deployment groups; and iii) feature administrator finds the desired deployment group (if necessary using search capability to search by group ID, group name, feature name, or feature ID) and invokes the desired action.

The auto-update of a given deployment group includes: i) feature administrator invokes the update action for a given deployment group; ii) feature lists that have been deployed appear automatically on the dashboard for this deployment group; iii) feature administrator reviews the list of features that may be deployed to this deployment group; iv) as appropriate, feature administrator specifies one or more features to be deployed to this deployment group (including removing features from the list if they should not be deployed to this deployment group); v) feature administrator reviews the nodes that are included in this deployment group; vi) as appropriate, feature administrator configures a customized list of features to deploy for specific nodes in this deployment group or for a specific node type (ISG, WSG, SCF); vii) feature administrator saves this deployment group configuration in the appropriate partner portal databases; viii) partner portal deploys the specified features to all nodes in the deployment group (corresponding WSG, ISG, and SCF nodes) except where overridden for a given node or node type with a customized list of features; ix) the list of features that may be deployed to this deployment group includes all of the features that are in a deployable state based on their assigned state in the feature management dashboard; x) when deploying features, all feature dependencies are resolved. If any dependency cannot be resolved during deployment, deployment of that feature will fail. The partner portal executes the necessary processes to direct SCF nodes to load the indicated features and to load the service definitions into WSG and ISG nodes.

Feature Management Use-case Design for Services and Enablers

Auto-deployment of Services/Enablers for a Feature Set

For any request that moves the service/enabler into a deployable state, the services/enablers are automatically deployed to impacted nodes per deployment group configuration settings: i) the necessary processes are automatically executed to direct impacted SCF nodes to load the bundles for the given service/enabler based on the feature definition; ii) the necessary processes are automatically executed to direct impacted SCF nodes to load the bundles for any feature dependencies identified for the given service/enabler (includes policy/enabler/utility feature bundles upon which dependencies exist); iii) target services definitions are deployed to the WSG based on parameters specified for web services gateway exposure; and iv) access policies are deployed to the WSG and the DS based on the operation category mappings defined for each interface (REST, SOAP, NATIVE) for the given service/enabler.

The auto-deletion of services/enablers for a feature set includes: a) for any request to delete a service, the service is automatically un-deployed after deleting the service from the feature repository; b) for any request to delete an enabler—b.1) if no deployed service is dependent on the enabler requested for deletion, the enabler is automatically un-deployed after deleting the enabler from the feature repository and b.2) if any deployed service is dependent on the enabler requested for deletion, the deletion request is failed with an appropriate warning message; c) for any request that invalidates the pre-existing service-context definition, the service is automatically disabled and related settings for any partner, application, or campaign using the service are also removed; and d) for any request that invalidates the pre-existing enabler-context definition, the enabler is automatically disabled and related settings for any service, partner, application, or campaign using the enabler is also removed.

Feature Management Use-case Design for Policies:

For any request to add a policy, the policy definition gets added automatically to the feature repository. For any request to delete a policy: i) if no deployed service/enabler is dependent on the policy requested for deletion, the policy gets automatically deleted from the feature repository; ii) if any deployed API is dependent on the policy requested for deletion, the deletion request gets automatically rejected with an appropriate warning message; and iii) related policy settings are removed for any service, enabler, partner, application, or campaign using the policy.

The system disclosed herein serves as a catalyst for partners/developers/service providers to build higher quality rich Internet applications by offering them a richer set of APIs and workflow designer tools to design and model rich services and content on Internet and within the operator's network. The system provides integration of the following major functional areas to gain increased synergies amongst members of the ecosystem: i) partners, developers and network operators, ii) applications and developer on-boarding, iii) aggregation service exposing common interfaces for accessing network enablers, iv) promotional campaign calendar, v) unified application store/warehouse for promoting content and applications, vi) applications central storefront deck management, vii) development of social community web portal, viii) a superior application development experience, and ix) marketing calendar and support at various levels.

The system provides help to service providers for tapping into the growing demand of mobile applications and seeks to provide the best of such services to its subscribers. It serves as a platform to provide service providers, their partners and subscribers with a large pipeline of applications on mobile handheld devices.

With reference to FIG. 28, a process 2800 for managing components of an application enablement suite (AES) begins at 2802 where an application developer is provided with access to a workflow designer engine via a developer portal in response to a proper authentication sequence. The workflow designer engine and developer portal are in operative communication with an AES. The authentication sequence is initiated in response to the application developer activating the workflow designer engine via a user device in operative communication with the developer portal. At 2804, a network application manager of the workflow designer engine is activated in response to the application developer selecting a manage network application function via the user device in conjunction with a graphical user interface (GUI) controlled by the developer portal. Next, a new network application is created using archetypes of the workflow designer engine and repositories of the developer portal in response to the application developer defining at least some parameters for the new network application in conjunction with the GUI (2806). The new network application is associated with a new or existing network service available to subscribers via the AES.

In another embodiment, the process 2800 also includes activating an application program interface (API) manager of the workflow designer engine in response to the application developer selecting a manage API function via the user device in conjunction with the GUI. In this embodiment, a new API is created using archetypes of the workflow designer engine and repositories of the developer portal in response to the application developer defining at least some parameters for the new API in conjunction with the GUI. The new API is associated with the new network application.

In yet another embodiment, the process 2800 also includes activating an application service manager of the workflow designer engine in response to the application developer selecting a manage application service function via the user device in conjunction with the GUI. In this embodiment, a new application service is created using archetypes of the workflow designer engine and repositories of the developer portal in response to the application developer defining at least some parameters for the new application service in conjunction with the GUI. The new application service is associated with the new network application.

In still another embodiment, the process 2800 also includes activating an application rule/policy manager of the workflow designer engine in response to the application developer selecting a manage application rule/policy function via the user device in conjunction with the GUI. In this embodiment, a new application rule/policy is created using archetypes of the workflow designer engine and repositories of the developer portal in response to the application developer defining at least some parameters for the new application rule/policy in conjunction with the GUI. The new application rule/policy is associated with the new network application.

In still yet another embodiment, the process 2800 also includes activating an application enabler manager of the workflow designer engine in response to the application developer selecting a manage application enabler function via the user device in conjunction with the GUI. In this embodiment, a new application enabler is created using archetypes of the workflow designer engine and repositories of the developer portal in response to the application developer defining at least some parameters for the new application enabler in conjunction with the GUI. The new application enabler is associated with the new network application.

In another embodiment, the process 2800 also includes activating an application mashup manager of the workflow designer engine in response to the application developer selecting a manage application mashup function via the user device in conjunction with the GUI. In this embodiment, a new application mashup is created using archetypes of the workflow designer engine and repositories of the developer portal in response to the application developer defining at least some parameters for the new application mashup in conjunction with the GUI. The new application mashup is associated with the new network application.

In yet another embodiment, the process 2800 also includes activating an application bundle manager of the workflow designer engine in response to the application developer selecting a manage application bundle function via the user device in conjunction with the GUI. In this embodiment, a new application bundle is created using archetypes of the workflow designer engine and repositories of the developer portal in response to the application developer defining the new application bundle in conjunction with the GUI. The new application bundle is associated with the new network application.

In still another embodiment, the process 2800 also includes activating a test manager of the workflow designer engine in response to selection of a manage test function via the GUI. In this embodiment, the new network application is tested using simulators of the workflow designer engine and repositories of the developer portal to verify the new network application is capable of providing the new or existing network service to subscribers via the AES.

In still yet another embodiment, the process 2800 also includes activating a deployment manager of the workflow designer engine in response to selection of a manage deployment function via the GUI. In this embodiment, the new network application is deployed using a deployment management module of the developer portal and repositories of the developer portal to make the new network application available to appropriate nodes of the AES such that the new network application is available in conjunction with providing the new or existing network service to subscribers via the AES.

In another embodiment of the process 2800, the new or existing network service is a composite network service associated with at least one of multiple network services, multiple service providers, multiple service networks, and multiple communication sessions.

Figure 29:
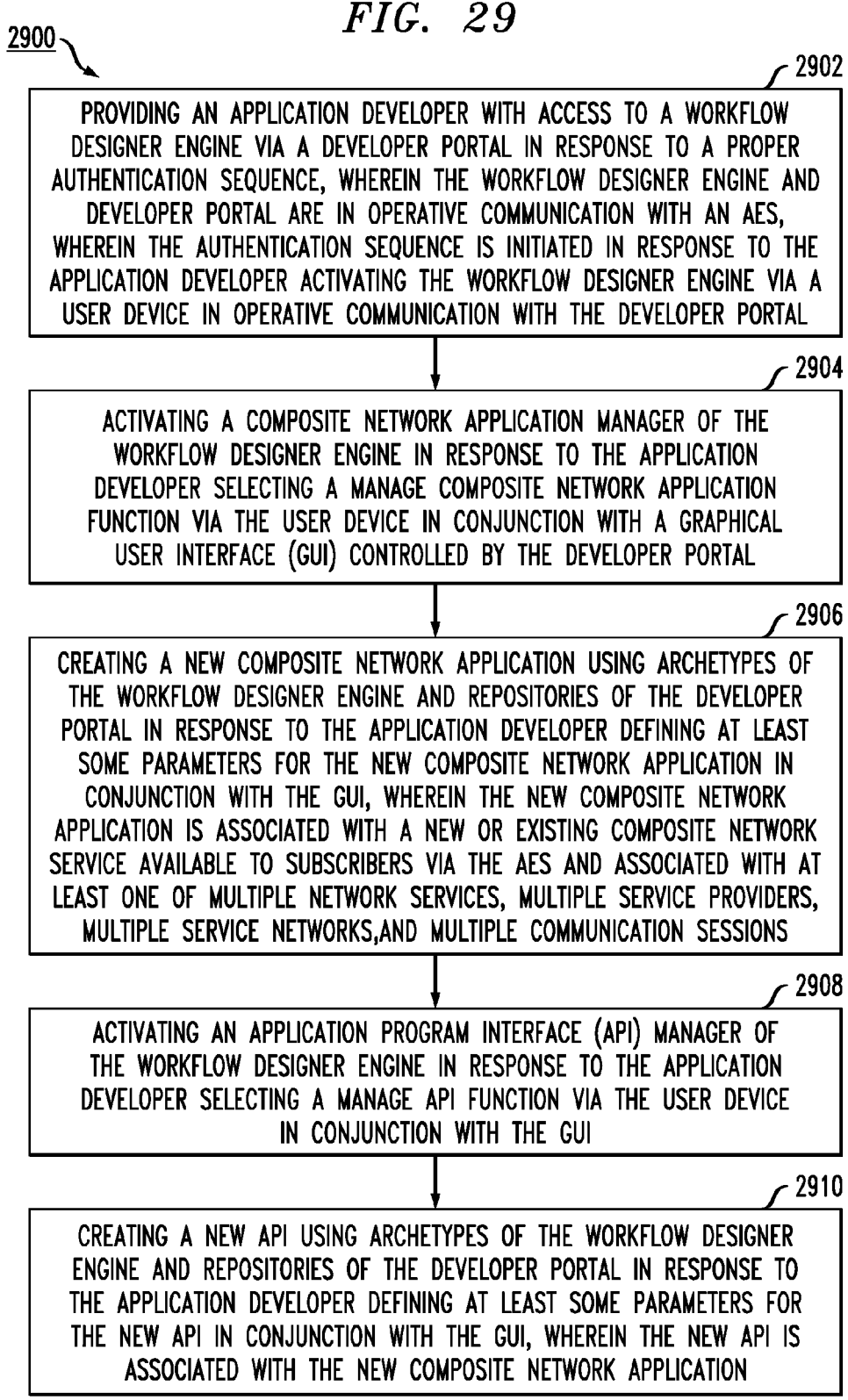
FIG. 29 is a flow chart of another exemplary embodiment of a process for managing components of an AES.

With reference to FIG. 29, a process 2900 for managing components of an application enablement suite (AES) begins at 2902 where an application developer is provided with access to a workflow designer engine via a developer portal in response to a proper authentication sequence. The workflow designer engine and developer portal are in operative communication with an AES. The authentication sequence is initiated in response to the application developer activating the workflow designer engine via a user device in operative communication with the developer portal. At 2904, a composite network application manager of the workflow designer engine is activated in response to the application developer selecting a manage composite network application function via the user device in conjunction with a graphical user interface (GUI) controlled by the developer portal. Next, a new composite network application is created using archetypes of the workflow designer engine and repositories of the developer portal in response to the application developer defining at least some parameters for the new composite network application in conjunction with the GUI (2906). The new composite network application is associated with a new or existing composite network service available to subscribers via the AES. The new composite network application is associated with at least one of multiple network services, multiple service providers, multiple service networks, and multiple communication sessions. At 2908, an application program interface (API) manager of the workflow designer engine is activated in response to the application developer selecting a manage API function via the user device in conjunction with the GUI. Next, a new API is created using archetypes of the workflow designer engine and repositories of the developer portal in response to the application developer defining at least some parameters for the new API in conjunction with the GUI (2910). The new API is associated with the new composite network application.

In another embodiment, the process 2900 also includes activating an application rule/policy manager of the workflow designer engine in response to the application developer selecting a manage application rule/policy function via the user device in conjunction with the GUI. In this embodiment, a new application rule/policy is created using archetypes of the workflow designer engine and repositories of the developer portal in response to the application developer defining at least some parameters for the new application rule/policy in conjunction with the GUI. The new application rule/policy is associated with the new composite network application.

In yet another embodiment, the process 2900 also includes activating an application enabler manager of the workflow designer engine in response to the application developer selecting a manage application enabler function via the user device in conjunction with the GUI. In this embodiment, a new application enabler is created using archetypes of the workflow designer engine and repositories of the developer portal in response to the application developer defining at least some parameters for the new application enabler in conjunction with the GUI. The new application enabler is associated with the new composite network application.

In still another embodiment, the process 2900 also includes activating an application mashup manager of the workflow designer engine in response to the application developer selecting a manage application mashup function via the user device in conjunction with the GUI. In this embodiment, a new application mashup is created using archetypes of the workflow designer engine and repositories of the developer portal in response to the application developer defining at least some parameters for the new application mashup in conjunction with the GUI. The new application mashup is associated with the new composite network application.

In still yet another embodiment, the process 2900 also includes activating a development tool manager of the workflow designer engine in response to selection of a manage development tool function via the GUI. In this embodiment, a new simulator for testing the new composite network application is created using archetypes of the workflow designer engine and repositories of the developer portal based at least in part on test processes and parameters for the new simulator identified via the GUI. The new simulator is adapted for testing the new composite network application in conjunction with repositories of the developer portal to verify that the new composite network application is capable of providing the new or existing network service to subscribers via the AES.

In another embodiment, the process 2900 also includes activating a development tool manager of the workflow designer engine in response to selection of a manage development tool function via the GUI. In this embodiment, a new rule/policy creation tool for the new composite network application is created using archetypes of the workflow designer engine and repositories of the developer portal based at least in part on operating processes and parameters for the new composite network application identified via the GUI. The new rule/policy creation tool enables the application developer to create and manage rules and policies for the new composite network application using the workflow designer engine and developer portal.

In yet another embodiment, the process 2900 also includes activating a development tool manager of the workflow designer engine in response to selection of a manage development tool function via the GUI. In this embodiment, a new configuration management tool for the new composite network application is created using archetypes of the workflow designer engine and repositories of the developer portal based at least in part on application development processes and parameters for the new composite network application identified via the GUI. The new configuration management tool is for configuration control of the new composite network application using the workflow designer engine and developer portal.

Figure 30:
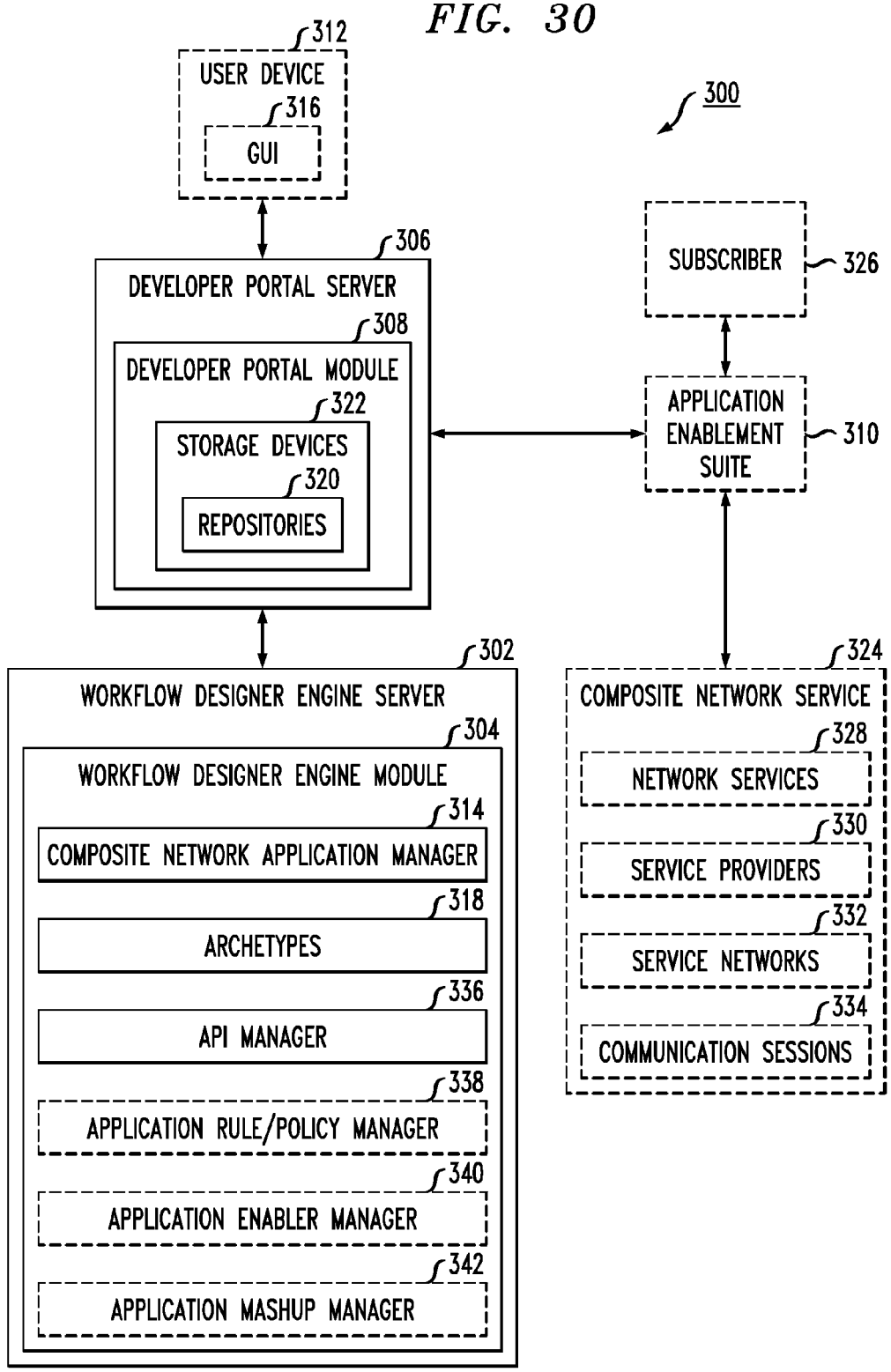
FIG. 30 is a block diagram of an exemplary embodiment of a process for managing components of an AES.

With reference to FIG. 30, a system 300 for managing components of an application enablement suite (AES) includes a workflow designer engine server 302 with a workflow designer engine module 304 and a developer portal server 306 with a developer portal module 308. The developer portal module 308 being in operative communication with the workflow designer engine module 304. The workflow designer engine module 304 and developer portal module 308 are in operative communication with an AES 310. The developer portal module 308 provides an application developer with access to the workflow designer engine module 304 in response to a proper authentication sequence. The authentication sequence is initiated in response to the application developer activating the workflow designer engine module 304 via a user device 312 in operative communication with the developer portal module 308.

The workflow designer engine module 304 activates a composite network application manager 314 in response to the application developer selecting a manage composite network application function via the user device 312 in conjunction with a graphical user interface (GUI) 316 controlled by the developer portal module 308.

A new composite network application is created using archetypes 318 of the workflow designer engine module 304 and repositories 320 in storage devices 322 of the developer portal module 308 in response to the application developer defining at least some parameters for the new composite network application in conjunction with the GUI 316. The new composite network application is associated with a new or existing composite network service 324 available to subscribers 326 via the AES 310 and associated with at least one of multiple network services 328, multiple service providers 330, multiple service networks 332, and multiple communication sessions 334.

The workflow designer engine module 304 activates an application program interface (API) manager 336 in response to the application developer selecting a manage API function via the user device 312 in conjunction with the GUI 316. A new API is created using archetypes 318 of the workflow designer engine module 304 and repositories 320 in storage devices 322 of the developer portal module 308 in response to the application developer defining at least some parameters for the new API in conjunction with the GUI 316. The new API is associated with the new composite network application.

In another embodiment of the system 300, the workflow designer engine module 304 activates an application rule/policy manager 338 in response to the application developer selecting a manage application rule/policy function via the user device 312 in conjunction with the GUI 316. A new application rule/policy is created using archetypes 318 of the workflow designer engine module 304 and repositories 320 in storage devices 322 of the developer portal module 308 in response to the application developer defining at least some parameters for the new application rule/policy in conjunction with the GUI 316. The new application rule/policy is associated with the new composite network application.

In yet another embodiment of the system 300, the workflow designer engine module 304 activates an application enabler manager 340 in response to the application developer selecting a manage application enabler function via the user device 312 in conjunction with the GUI 316. A new application enabler is created using archetypes 318 of the workflow designer engine module 304 and repositories 320 in storage devices 322 of the developer portal module 308 in response to the application developer defining at least some parameters for the new application enabler in conjunction with the GUI 316. The new application enabler is associated with the new composite network application.

In still another embodiment of the system 300, the workflow designer engine module 304 activates an application mashup manager 342 in response to the application developer selecting a manage application mashup function via the user device 312 in conjunction with the GUI 316. A new application mashup is created using archetypes 318 of the workflow designer engine module 304 and repositories 320 in storage devices 322 of the developer portal module 308 in response to the application developer defining at least some parameters for the new application utility in conjunction with the GUI 316. The new application mashup is associated with the new composite network application.

It is understood that the suites, platforms, servers, and other structural resources described herein may be implemented through any suitable combination of processors, computers, work stations, computer systems, and accompanying peripheral devices. The computer equipment can include any suitable combination of devices for user interfaces, including portable devices, mobile devices, wireless devices, input devices, pointing devices, display devices, and monitors.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of managing components of an application enablement suite (AES), comprising:

providing an application developer with access to a workflow designer engine via a developer portal in response to a proper authentication sequence, wherein the workflow designer engine and developer portal are in operative communication with an AES, wherein the authentication sequence is initiated in response to the application developer activating the workflow designer engine via a user device in operative communication with the developer portal;

activating a network application manager of the workflow designer engine in response to the application developer selecting a manage network application function via the user device in conjunction with a graphical user interface (GUI) controlled by the developer portal; and creating a new network application using archetypes of the workflow designer engine and repositories of the developer portal in response to the application developer defining at least some parameters for the new network application in conjunction with the GUI, wherein the new network application is associated with a new or existing network service available to subscribers via the AES;

wherein the workflow designer engine and developer portal form a layer between the GUI and the AES;

wherein the archetypes include a configurable set of basic definitions and design patterns accessible to the application developer via the developer portal for creation of the new network application;

wherein the repositories include a configurable set of application features accessible to the application developer via the developer portal for creation of the new network application;

wherein the new or existing network service is a composite network service associated with at least one of multiple network services, multiple service providers, multiple service networks, and multiple communication sessions.

2. The method set forth in claim 1, further comprising:
activating an application program interface (API) manager of the workflow designer engine in response to the application developer selecting a manage API function via the user device in conjunction with the GUI; and creating a new API using archetypes of the workflow designer engine and repositories of the developer portal in response to the application developer defining at least some parameters for the new API in conjunction with the GUI, wherein the new API is associated with the new network application.

3. The method set forth in claim 1, further comprising:

activating an application service manager of the workflow designer engine in response to the application developer selecting a manage application service function via the user device in conjunction with the GUI; and creating a new application service using archetypes of the workflow designer engine and repositories of the developer portal in response to the application developer defining at least some parameters for the new application service in conjunction with the GUI, wherein the new application service is associated with the new network application.

4. The method set forth in claim 1, further comprising:

activating an application rule or policy manager of the workflow designer engine in response to the application developer selecting a manage application rule or policy function via the user device in conjunction with the GUI; and creating a new application rule or policy using archetypes of the workflow designer engine and repositories of the developer portal in response to the application developer defining at least some parameters for the new application rule/policy in conjunction with the GUI, wherein the new application rule or policy is associated with the new network application.

5. The method set forth in claim 1, further comprising:

activating an application enabler manager of the workflow designer engine in response to the application developer selecting a manage application enabler function via the user device in conjunction with the GUI; and creating a new application enabler using archetypes of the workflow designer engine and repositories of the developer portal in response to the application developer defining at least some parameters for the new application enabler in conjunction with the GUI, wherein the new application enabler is associated with the new network application.

6. The method set forth in claim 1, further comprising:

activating an application mashup manager of the workflow designer engine in response to the application developer selecting a manage application mashup function via the user device in conjunction with the GUI; and creating a new application mashup using archetypes of the workflow designer engine and repositories of the developer portal in response to the application developer defining at least some parameters for the new application mashup in conjunction with the GUI, wherein the new application mashup is associated with the new network application.

7. The method set forth in claim 1, further comprising:

activating an application bundle manager of the workflow designer engine in response to the application developer selecting a manage application bundle function via the user device in conjunction with the GUI; and creating a new application bundle using archetypes of the workflow designer engine and repositories of the developer portal in response to the application developer defining the new application bundle in conjunction with the GUI, wherein the new application bundle is associated with the new network application.

8. The method set forth in claim 1, further comprising:

activating a test manager of the workflow designer engine in response to selection of a manage test function via the GUI; and testing the new network application using simulators of the workflow designer engine and repositories of the developer portal to verify the new network application is capable of providing the new or existing network service to subscribers via the AES.

9. The method set forth in claim 1, further comprising:

activating a deployment manager of the workflow designer engine in response to selection of a manage deployment function via the GUI; and deploying the new network application using a deployment management module of the developer portal and repositories of the developer portal to make the new network application available to appropriate nodes of the AES such that the new network application is available in conjunction with providing the new or existing network service to subscribers via the AES.

10. A method of managing components of an application enablement suite (AES), comprising:

providing an application developer with access to a workflow designer engine via a developer portal in response to a proper authentication sequence, wherein the workflow designer engine and developer portal are in operative communication with an AES, wherein the authentication sequence is initiated in response to the application developer activating the workflow designer engine via a user device in operative communication with the developer portal;

activating a composite network application manager of the workflow designer engine in response to the application developer selecting a manage composite network application function via the user device in conjunction with a graphical user interface (GUI) controlled by the developer portal;

creating a new composite network application using archetypes of the workflow designer engine and repositories of the developer portal in response to the application developer defining at least some parameters for the new composite network application in conjunction with the GUI, wherein the new composite network application is associated with a new or existing composite network service available to subscribers via the AES and associated with at least one of multiple network services, multiple service providers, multiple service networks, and multiple communication sessions;

activating an application program interface (API) manager of the workflow designer engine in response to the application developer selecting a manage API function via the user device in conjunction with the GUI; and creating a new API using archetypes of the workflow designer engine and repositories of the developer portal in response to the application developer defining at least some parameters for the new API in conjunction with the GUI, wherein the new API is associated with the new composite network application;

wherein the workflow designer engine and developer portal form a layer between the GUI and the AES;

wherein the archetypes include a configurable set of basic definitions and design patterns accessible to the application developer via the developer portal for creation of the new network application;

wherein the repositories include a configurable set of application features accessible to the application developer via the developer portal for creation of the new network application.

11. The method set forth in claim 10, further comprising:
activating an application rule or policy manager of the workflow designer engine in response to the application developer selecting a manage application rule or policy function via the user device in conjunction with the GUI; and
creating a new application rule or policy using archetypes of the workflow designer engine and repositories of the developer portal in response to the application developer defining at least some parameters for the new application rule or policy in conjunction with the GUI, wherein the new application rule or policy is associated with the new composite network application.

12. The method set forth in claim 10, further comprising:
activating an application enabler manager of the workflow designer engine in response to the application developer selecting a manage application enabler function via the user device in conjunction with the GUI; and
creating a new application enabler using archetypes of the workflow designer engine and repositories of the developer portal in response to the application developer defining at least some parameters for the new application enabler in conjunction with the GUI, wherein the new application enabler is associated with the new composite network application.

13. The method set forth in claim 10, further comprising:
activating an application mashup manager of the workflow designer engine in response to the application developer selecting a manage application mashup function via the user device in conjunction with the GUI; and
creating a new application mashup using archetypes of the workflow designer engine and repositories of the developer portal in response to the application developer defining at least some parameters for the new application mashup in conjunction with the GUI, wherein the new application mashup is associated with the new composite network application.

14. The method set forth in claim 10, further comprising:
activating a development tool manager of the workflow designer engine in response to selection of a manage development tool function via the GUI; and
creating a new simulator for testing the new composite network application using archetypes of the workflow designer engine and repositories of the developer portal based at least in part on test processes and parameters for the new simulator identified via the GUI, wherein the new simulator is adapted for testing the new composite network application in conjunction with repositories of the developer portal to verify that the new composite network application is capable of providing the new or existing composite network service to subscribers via the AES.

15. The method set forth in claim 10, further comprising:
activating a development tool manager of the workflow designer engine in response to selection of a manage development tool function via the GUI; and
creating a new rule or policy creation tool for the new composite network application using archetypes of the workflow designer engine and repositories of the developer portal based at least in part on operating processes and parameters for the new composite network application identified via the GUI, wherein the new rule or policy creation tool enables the application developer to create and manage rules and policies for the new composite network application using the workflow designer engine and developer portal.

16. The method set forth in claim 10, further comprising:
activating a development tool manager of the workflow designer engine in response to selection of a manage development tool function via the GUI; and
creating a new configuration management tool for the new composite network application using archetypes of the workflow designer engine and repositories of the developer portal based at least in part on application development processes and parameters for the new composite network application identified via the GUI, wherein the new configuration management tool is for configuration control of the new composite network application using the workflow designer engine and developer portal.

17. An apparatus for managing components of an application enablement suite (AES), comprising:
a workflow designer engine server including a workflow designer engine module; and
a developer portal server including a developer portal module in operative communication with the workflow designer engine module, wherein the workflow designer engine module and developer portal module are configured to communicate with an AES;
wherein the developer portal module is configured to provide an application developer with access to the workflow designer engine module in response to a proper authentication sequence, wherein the authentication sequence is initiated in response to the application developer activating the workflow designer engine module via a user device in operative communication with the developer portal module;
wherein the workflow designer engine module is configured to activate a composite network application manager in response to the application developer selecting a manage composite network application function via the user device in conjunction with a graphical user interface (GUI) controlled by the developer portal module;
wherein the workflow designer engine module and developer portal module are configured to create a new composite network application using archetypes of the workflow designer engine module and repositories in storage devices of the developer portal module in response to the application developer defining at least some parameters for the new composite network application in conjunction with the GUI, wherein the new composite network application is associated with a new or existing composite network service available to subscribers via the AES and associated with at least one of multiple network services, multiple service providers, multiple service networks, and multiple communication sessions;
wherein the workflow designer engine module is configured to activate an application program interface (API) manager in response to the application developer selecting a manage API function via the user device in conjunction with the GUI;
wherein the workflow designer engine module and developer portal module are configured to create a new API using archetypes of the workflow designer engine module and repositories in storage devices of the developer portal module in response to the application developer defining at least some parameters for the new API in conjunction with the GUI, wherein the new API is associated with the new composite network application;

wherein the workflow designer engine and developer portal are configured to form a layer between the GUI and the AES;

wherein the archetypes include a configurable set of basic definitions and design patterns accessible to the application developer via the developer portal for creation of the new network application;

wherein the repositories include a configurable set of application features accessible to the application developer via the developer portal for creation of the new network application.

18. The apparatus set forth in claim 17 wherein the workflow designer engine module is configured to activate an application rule or policy manager in response to the application developer selecting a manage application rule or policy function via the user device in conjunction with the GUI; and wherein the workflow designer engine module and developer portal module are configured to create a new application rule or policy using archetypes of the workflow designer engine module and repositories in storage devices of the developer portal module in response to the application developer defining at least some parameters for the new application rule or policy in conjunction with the GUI, wherein the new application rule or policy is associated with the new composite network application.

19. The apparatus set forth in claim 17 wherein the workflow designer engine module is configured to activate an application enabler manager in response to the application developer selecting a manage application enabler function via the user device in conjunction with the GUI; and wherein the workflow designer engine module and developer portal module are configured to create a new application enabler using archetypes of the workflow designer engine module and repositories in storage devices of the developer portal module in response to the application developer defining at least some parameters for the new application enabler in conjunction with the GUI, wherein the new application enabler is associated with the new composite network application.

20. The apparatus set forth in claim 17 wherein the workflow designer engine module is configured to activate an application mashup manager in response to the application developer selecting a manage application mashup function via the user device in conjunction with the GUI; and wherein the workflow designer engine module and developer portal module are configured to create a new application mashup using archetypes of the workflow designer engine module and repositories in storage devices of the developer portal module in response to the application developer defining at least some parameters for the new application utility in conjunction with the GUI, wherein the new application mashup is associated with the new composite network application.

21. The apparatus set forth in claim 17 wherein the workflow designer engine module is configured to activate a development tool manager in response to selection of a manage development tool function via the GUI; and wherein the workflow designer engine module and developer portal module are configured to create a new simulator for testing the new composite network application using archetypes of the workflow designer engine and repositories of the developer portal based at least in part on test processes and parameters for the new simulator identified via the GUI, wherein the new simulator is adapted for testing the new composite network application in conjunction with repositories of the developer portal to verify that the new composite network application is capable of providing the new or existing composite network service to subscribers via the AES.

\* \* \* \* \*